United States Patent
Numata

(10) Patent No.: US 12,042,766 B2
(45) Date of Patent: Jul. 23, 2024

(54) CROSS-FLOW FILTRATION DEVICE AND CROSS-FLOW FILTRATION METHOD

(71) Applicant: NEC CORPORATION, Tokyo (JP)

(72) Inventor: Hideaki Numata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 16/649,692

(22) PCT Filed: Sep. 29, 2017

(86) PCT No.: PCT/JP2017/035694
§ 371 (c)(1),
(2) Date: Mar. 23, 2020

(87) PCT Pub. No.: WO2019/064565
PCT Pub. Date: Apr. 4, 2019

(65) Prior Publication Data
US 2020/0254389 A1 Aug. 13, 2020

(51) Int. Cl.
| | | |
|---|---|---|
| *B01D 61/14* | (2006.01) | |
| *B01D 61/22* | (2006.01) | |
| *B01D 65/02* | (2006.01) | |

(52) U.S. Cl.
CPC .......... *B01D 61/145* (2013.01); *B01D 61/22* (2013.01); *B01D 61/147* (2013.01); *B01D 65/02* (2013.01); *B01D 2311/14* (2013.01); *B01D 2313/50* (2013.01); *B01D 2315/10* (2013.01)

(58) Field of Classification Search
None
See application file for complete search history.

(56) References Cited

U.S. PATENT DOCUMENTS

| | | | | |
|---|---|---|---|---|
| 2003/0034305 A1* | 2/2003 | Luehmann | ............. | B01D 61/58 210/257.2 |
| 2012/0234694 A1* | 9/2012 | Vecitis | .................. | B01D 35/06 205/747 |
| 2013/0059371 A1* | 3/2013 | Shevitz | .................. | B01D 63/02 210/257.2 |

FOREIGN PATENT DOCUMENTS

| | | |
|---|---|---|
| JP | 2008-133178 A | 6/2008 |
| JP | 2013-542852 A | 11/2013 |

(Continued)

OTHER PUBLICATIONS

Machine translation JP2000/0317274 (Year: 2000).*

(Continued)

*Primary Examiner* — Kara M Peo
(74) *Attorney, Agent, or Firm* — Sughrue Mion, PLLC

(57) ABSTRACT

A cross-flow filtration device includes: a filter module which includes an inner chamber and an outer chamber separated by a semipermeable membrane; a process liquid tank which is configured to accommodate a process liquid; a pump which is configured to cause the process liquid to circulate to the inner chamber in the filter module and the process liquid tank; a replenisher tank which is configured to accommodate a replenisher liquid to be replenished into the process liquid tank, at least one or more sensors which are configured to measure a pressure of the circulating process liquid; and a replenisher measurement unit which is configured to measure an amount of the replenisher liquid supplied from the replenisher tank to the process liquid tank. The process liquid tank is configured to be continuously replenished with the replenisher liquid.

14 Claims, 15 Drawing Sheets

(56) References Cited

FOREIGN PATENT DOCUMENTS

| JP | 2015-515368 A | 5/2015 |
|---|---|---|
| JP | 2017-119586 A | 7/2017 |

OTHER PUBLICATIONS

Machine translation JP2001/079357 (Year: 2001).*
Japanese Office Action for JP Application No. 2019-544163 mailed on Mar. 23, 2021 with English Translation.
International Search Report of PCT/JP2017/035694 dated Dec. 19, 2017 [PCT/ISA/210].
Japanese Office Communication for JP Application No. 2019-544163 mailed on Sep. 5, 2022 with English Translation.

* cited by examiner

CROSS-FLOW FILTRATION DEVICE AND CROSS-FLOW FILTRATION METHOD

CROSS REFERENCE TO RELATED APPLICATIONS

This application is a National Stage of International Application No. PCT/JP2017/035694, filed Sep. 29, 2017.

TECHNICAL FIELD

The present invention relates to a cross-flow filtration device and a cross-flow filtration method.

BACKGROUND ART

In recent years, it has come to be expected that carbon materials having a size in a nanometer range (hereinafter referred to as "nanocarbons") will be applied in various fields due to their mechanical properties, electrical properties, chemical properties, and the like.

When nanocarbons are used as an electronic material, for example, the nanocarbons are used in the form of a nanocarbon dispersion liquid in which the nanocarbons and a surfactant are dispersed in a solvent.

In the case of a dispersion liquid containing a surfactant, it is necessary to remove excess surfactant in accordance with a subsequent utilization method. In the related art, examples of a method for removing a surfactant include a static dialysis method (a filtration method). As a method for manufacturing a nanocarbon dispersion liquid using a filtration method, for example, a method including a step of wetting crude carbon nanotubes using a solvent containing water, a step of subjecting the crude carbon nanotubes to acid treatment using an aqueous solution containing nitric acid, and a step of filtering a reaction solution obtained through the previous steps is known (for example, refer to Patent Document 1). Furthermore, a method for purifying a dispersion liquid by subjecting a coarse dispersion liquid in which fibrous carbon nanostructures are mixed with nitric acid and pure water to cross-flow filtration using a ceramic membrane is known (for example, refer to Patent Document 2).

PRIOR ART DOCUMENTS

Patent Documents

[Patent Document 1] Japanese Unexamined Patent Application, First Publication No. 2008-133178
[Patent Document 2] Japanese Unexamined Patent Application, First Publication No. 2017-119586

SUMMARY OF THE INVENTION

Problem to be Solved by the Invention

However, since the methods disclosed in Patent Document 1 and Patent Document 2 have long processing times, the efficiencies thereof are low. Furthermore, in the methods disclosed in Patent Document 1 and Patent Document 2, it is difficult to determine the end of a process of removing a surfactant. For this reason, in the methods disclosed in Patent Document 1 and Patent Document 2, the process of removing a surfactant is performed to an excessive extent, the amount of the surfactant in the dispersion liquid which has been subjected to the treatment becomes too small, and thus the nanocarbons aggregate.

An object of the present invention is to provide a cross-flow filtration device and a cross-flow filtration method capable of efficiently determining the end of a process of removing an excess component contained in a solution such as a dispersion liquid in the process of removing an excess component.

Means for Solving the Problem

A cross-flow filtration device of the present invention includes: a filter module which includes an inner chamber and an outer chamber separated by a semipermeable membrane; a process liquid tank which is configured to accommodate a process liquid; a pump which is configured to cause the process liquid to circulate to the inner chamber in the filter module and the process liquid tank; a replenisher tank which is configured to accommodate a replenisher liquid to be replenished into the process liquid tank; at least one or more sensors which are configured to measure a pressure of the circulating process liquid; and a replenisher measurement unit which is configured to measure an amount of the replenisher liquid supplied from the replenisher tank to the process liquid tank, wherein the process liquid tank is configured to be continuously replenished with the replenisher liquid.

A cross-flow filtration method of the present invention is a cross-flow filtration method using the cross-flow filtration device of the present invention including: a step of causing the process liquid to circulate to the inner chamber and the process liquid tank, and a step of determining the end of circulation of the process liquid in accordance with the amount of replenisher liquid in the replenisher tank.

Effect of the Invention

According to the present invention, it is possible to efficiently determine the end of a process of removing an excess component contained in a process liquid in the process of removing an excess component.

EMBODIMENTS FOR CARRYING OUT THE INVENTION

Example embodiments of a cross-flow filtration device and a cross-flow filtration method according to the present invention will be described.

These example embodiments are specifically described to make the gist of the invention be better understood and are not intended to limit the present invention unless otherwise stated.

First Example Embodiment (Cross-Flow Filtration Device)

Figure 1:
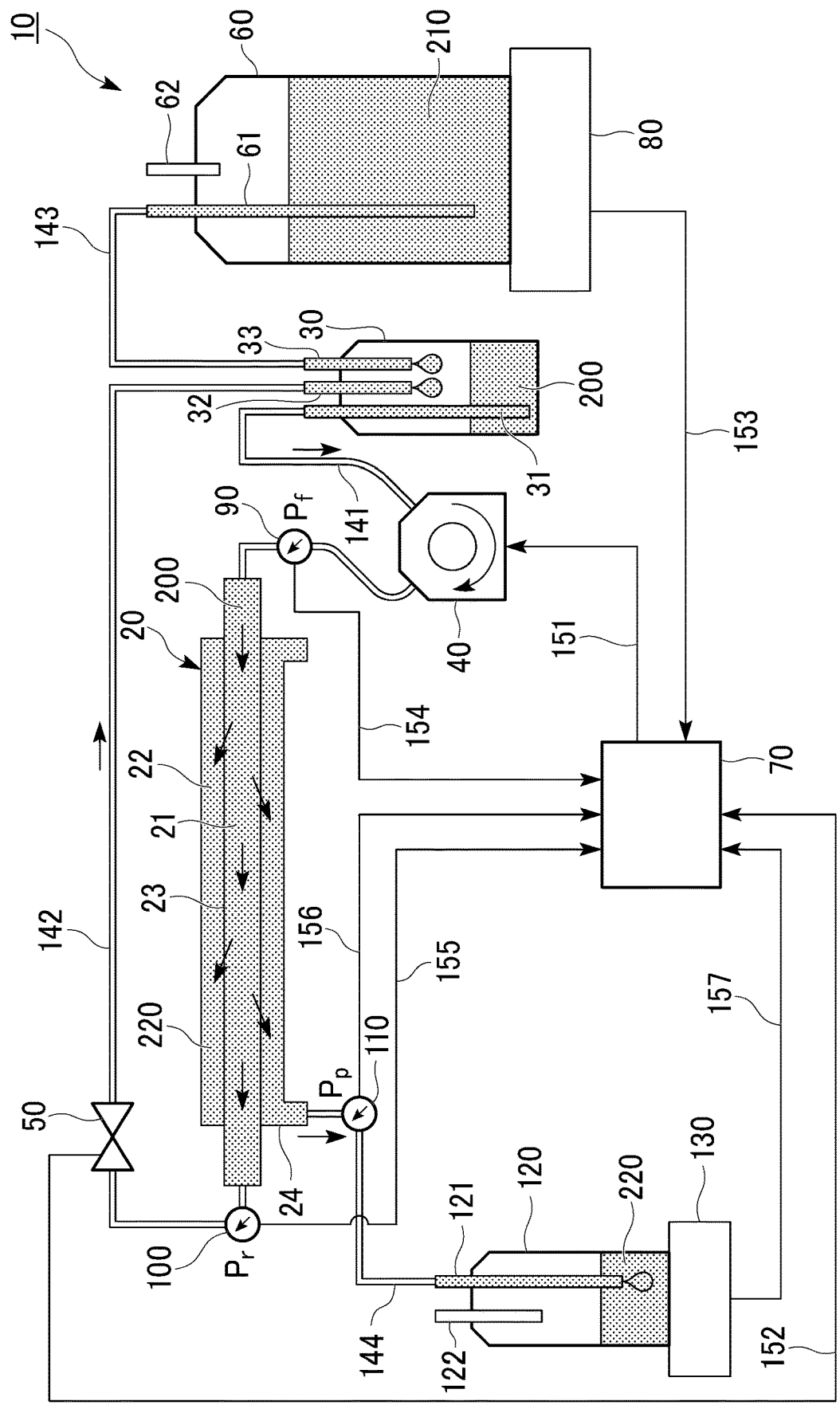
FIG. 1 is a schematic diagram showing a cross-flow filtration device according to a first example embodiment.

FIG. 1 is a schematic diagram showing a cross-flow filtration device according to this example embodiment.

A cross-flow filtration device 10 in this example embodiment includes a filter module 20, a process liquid tank 30, a pump 40, a pressure regulator 50, a replenisher tank 60, a controller 70, a replenisher measurement unit 80, a first pressure sensor 90 ($P_f$), a second pressure sensor 100 ($P_r$), and a third pressure sensor 110 ($P_p$). Furthermore, the cross-flow filtration device 10 in this example embodiment may include a permeation liquid tank 120 and a permeation liquid measurement unit 130.

The filter module 20 includes an inner chamber 21 and an outer chamber 22 arranged in contact with an outer circumference of the inner chamber 21.

A semipermeable membrane 23 is provided between the inner chamber 21 and the outer chamber 22.

The process liquid tank 30 is for accommodating a process liquid 200 containing a dispersoid, a dispersant, and a dispersion medium.

The process liquid tank 30 includes a suction pipe 31 which suctions the process liquid 200 accommodated therein and supplies the process liquid 200 to the filter module 20. A distal end portion of the suction pipe 31 is immersed in the process liquid 200 inside the process liquid tank 30.

Also, the process liquid tank 30 includes a recovery pipe 32 which recovers the process liquid 200 which has circulated through the filter module 20.

Furthermore, the process liquid tank 30 includes an injection pipe 33 which injects a replenisher liquid 210 replenished from the replenisher tank 60.

The process liquid tank 30 is airtight in a state being including the suction pipe 31, the recovery pipe 32, and the injection pipe 33.

As a permeation liquid 220 is drained from the filter module 20, an amount of the process liquid 200 inside the process liquid tank 30 decreases. Since the process liquid tank 30 is airtight, the inside of the process liquid tank 30 reaches a negative pressure due to a decrease in amount of the process liquid 200. Thus, a difference between atmospheric pressure and a pressure inside the process liquid tank 30 serves as a suction force and thus the replenisher liquid 210 is automatically supplied from the replenisher tank 60 to the process liquid tank 30. When the inside of the process liquid tank 30 and atmospheric pressure are balanced, the supply of the replenisher liquid 210 stops. In this way, in the cross-flow filtration device 10 in this example embodiment, the replenisher liquid 210 is continuously replenished into the process liquid tank 30. As a result, the amount of the process liquid 200 inside the process liquid tank 30 is automatically maintained.

Therefore, in the cross-flow filtration device 10 in this example embodiment, an amount of the permeation liquid 220 drained from the filter module 20 is equal to an amount of the replenisher liquid 210 replenished from the replenisher tank 60 to the process liquid tank 30. Furthermore, although an amount of the permeation liquid 220 per unit time (a flow rate of the permeation liquid 220) and an amount of the replenisher liquid 210 per unit time (a flow rate of the replenisher liquid 210) vary slightly due to the pulsation or the like of the pump 40, an amount of the permeation liquid 220 per unit time is equal to an amount of the replenisher liquid 210 per unit time.

The suction pipe 31 is connected to an inlet side of the inner chamber 21 in the filter module 20 via a first pipe 141.

The recovery pipe 32 is connected to an outlet side of the inner chamber 21 in the filter module 20 via a second pipe 142.

The injection pipe 33 is connected to the suction pipe 61 in the replenisher tank 60 via a third pipe 143.

The pump 40 is for causing the process liquid 200 to circulate to the inner chamber 21 of the filter module 20 and the process liquid tank 30.

The pump 40 is provided in the middle of the first pipe 141.

The pressure regulator 50 is for regulating a pressure of the inner chamber 21 in the filter module 20. When the pressure regulator 50 is operated, it is possible to regulate a pressure applied to the semipermeable membrane 23 due to the process liquid 200 circulating through the inner chamber 21 in the filter module 20.

The pressure regulator 50 is provided in the middle of the second pipe 142.

It is also possible to regulate the pressure of the inner chamber 21 in the filter module 20 using an inner diameter of the second pipe 142 and a flow rate of circulation in the pump 40 instead of providing the pressure regulator 50.

The replenisher tank 60 is for accommodating the replenisher liquid 210 replenished into the process liquid tank 30.

The replenisher tank 60 includes the suction pipe 61 which suctions the replenisher liquid 210 accommodated therein and supplies the replenisher liquid 210 into the process liquid tank 30. A distal end portion of the suction pipe 61 is immersed in the replenisher liquid 210 inside the replenisher tank 60.

Also, the replenisher tank 60 includes a ventilation pipe 62 which keeps an internal pressure therein equal to atmospheric pressure.

The controller 70 is electrically connected to the pump 40 with a cable 151 therebetween.

The controller 70 is electrically connected to the pressure regulator 50 with a cable 152 therebetween.

The controller 70 is electrically connected to the replenisher measurement unit 80 with a cable 153 therebetween.

The controller 70 is electrically connected to the first pressure sensor 90 ($P_f$) with a cable 154 therebetween.

The controller 70 is electrically connected to the second pressure sensor 100 ($P_r$) with a cable 155 therebetween.

Also, the controller 70 is electrically connected to the third pressure sensor 110 ($P_p$) with a cable 156 therebetween.

The controller 70 controls an operation of the pump 40 on the basis of the amount of the replenisher liquid 210. Furthermore, the controller 70 can also control an operation of the pump 40 on the basis of signals from the first pressure sensor 90, the second pressure sensor 100, and the third pressure sensor 110.

Figure 2:
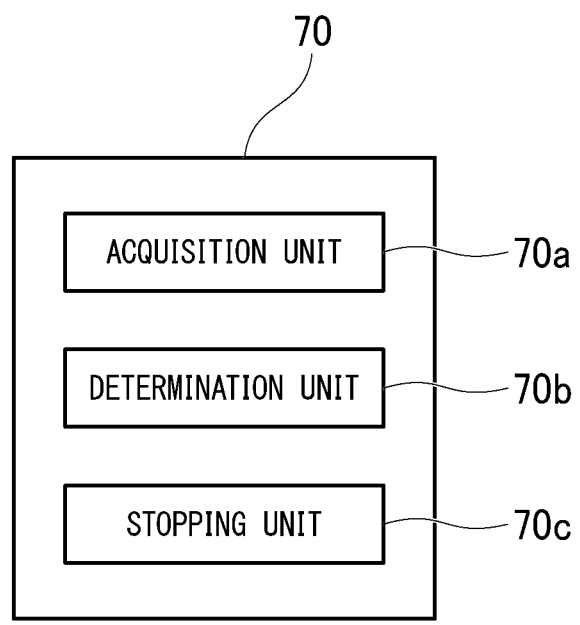
FIG. 2 is a block diagram showing a schematic constitution of a controller in the cross-flow filtration device according to the first example embodiment.

As shown in FIG. 2, the controller 70 functionally includes an acquisition unit 70a which acquires an amount of the replenisher liquid 210 supplied from the replenisher tank 60 to the process liquid tank 30 measured by the replenisher measurement unit 80, a determination unit 70b which determines the end of circulation of the process liquid 200 on the basis of the amount of the replenisher liquid 210 acquired by the acquisition unit 70a, and a stopping unit 70c which, if the end of circulation of the process liquid 200 is determined in the determination unit 70b, after an over processing time has elapsed, sends a stop command to the pump 40.

In this example embodiment, the determination unit 70b determines that the amount of the replenisher liquid 210 acquired by the acquisition unit 70a has reached a predetermined value to determine the end.

The replenisher measurement unit 80 is for measuring an amount of the replenisher liquid 210 supplied from the replenisher tank 60 to the process liquid tank 30. The replenisher measurement unit 80 measures an amount of the replenisher liquid 210 inside the replenisher tank 60 and a change in amount (a flow rate) of the liquid of the replenisher tank 60 per unit time.

The first pressure sensor 90 ($P_f$) is for measuring a pressure of the process liquid 200 in the inner chamber 21 in the filter module 20 on the inlet side thereof.

The first pressure sensor 90 ($P_f$) is provided in the vicinity of an inlet of the inner chamber 21 in the filter module 20 in the first pipe 141.

The second pressure sensor 100 ($P_r$) is for measuring a pressure of the process liquid 200 in the inner chamber 21 in the filter module 20 on the outlet side thereof.

The second pressure sensor 100 ($P_r$) is provided in the vicinity of an outlet of the inner chamber 21 in the filter module 20 in the second pipe 142.

The third pressure sensor 110 ($P_p$) is for measuring a pressure of the permeation liquid 220 which passed through the semipermeable membrane 23 of the outer chamber 22 in the filter module 20 on a drain port 24 side thereof.

The third pressure sensor 110 ($P_p$) is provided in the vicinity of the drain port 24 of the outer chamber 22 in the filter module 20 in a fourth pipe 144.

The permeation liquid tank 120 is for recovering the permeation liquid 220 drained through the drain port 24.

The permeation liquid tank 120 includes the recovery pipe 121 through which the permeation liquid 220 drained through the drain port 24 is recovered. A distal end portion of the recovery pipe 121 is immersed in the permeation liquid 220 inside the permeation liquid tank 120.

The recovery pipe 121 is connected to the drain port 24 of the outer chamber 22 in the filter module 20 via the fourth pipe 144.

Also, the permeation liquid tank 120 includes the ventilation pipe 122 which keeps an internal pressure therein equal to atmospheric pressure.

The permeation liquid measurement unit 130 is for measuring an amount of the permeation liquid 220 drained through the drain port 24. The permeation liquid measurement unit 130 measures an amount of the permeation liquid 220 inside the permeation liquid tank 120 and a change in amount (a flow rate) of the permeation liquid tank 120 per unit time.

The inner chamber 21 in the filter module 20 has a space (a flow path) through which the process liquid 200 can pass. A shape and a size of the inner chamber 21 in the filter module 20 are not particularly limited as long as the process liquid 200 can pass therethrough.

A material of the inner chamber 21 is not particularly limited as long as the material is stable with respect to the process liquid 200 and the replenisher liquid 210. Examples of the material of the inner chamber 21 include glass, a polycarbonate, a polypropylene, and the like.

The outer chamber 22 in the filter module 20 has a space (a flow path) through which the permeation liquid 220 which has passed through the semipermeable membrane 23 can pass. A shape and a size of the outer chamber 22 in the filter module 20 is not particularly limited as long as the permeation liquid 220 can pass therethrough.

A material of the outer chamber 22 is not particularly limited as long as the material is stable with respect to the permeation liquid 220. Examples of the material of the outer chamber 22 include glass, a polycarbonate, a polypropylene, and the like.

A fine pore diameter of the semipermeable membrane 23 is not particularly limited as long as the pore diameter is smaller than that of a dispersoid for nanocarbons and the like contained in the process liquid 200 and larger than that of surfactant molecules. As the semipermeable membrane 23, for example, it is desirable to utilize semipermeable membranes having a fine pore size of 30 kDa to 750 kDa.

A material of the semipermeable membrane 23 is not particularly limited as long as the material is stable with respect to the process liquid 200 and a desired fine pore diameter is obtained. Examples of the material of the semipermeable membrane 23 include a polyethersulfone, a polysulfone, a cellulose ester, and a material obtained by subjecting these materials to surface treatment.

The process liquid tank 30 has a space in which the process liquid 200 and the replenisher liquid 210 can be accommodated. A shape and a size of the process liquid tank 30 are not particularly limited as long as the process liquid 200 and the replenisher liquid 210 can be accommodated therein.

A material of the process liquid tank 30 is not particularly limited as long as the material is stable with respect to the process liquid 200 and the replenisher liquid 210. Examples of the materials of the process liquid tank 30 include glass, a polypropylene, a polyethylene, a Teflon (registered trademark) resin, stainless steel, and the like.

Materials of the suction pipe 31, the recovery pipe 32, and the injection pipe 33 are not particularly limited as long as the materials are stable with respect to the process liquid 200 and the replenisher liquid 210. Examples of the materials of the suction pipe 31, the recovery pipe 32, and the injection pipe 33 include glass, a polypropylene, a polyethylene, a Teflon (registered trademark) resin, and the like.

The pump 40 is not particularly limited as long as the pump 40 can cause the process liquid 200 to circulate to the inner chamber 21 in the filter module 20 and the process liquid tank 30. Examples of the pump 40 include a liquid feed pump.

Examples of the pressure regulator 50 include, but not particularly limited to, a pinch valve and the like.

The replenisher tank 60 has a space in which the replenisher liquid 210 can be accommodated. The shape and the size of the replenisher tank 60 are not particularly limited as long as the replenisher liquid 210 can be accommodated therein.

A material of the replenisher tank 60 is not particularly limited as long as the material is stable with respect to the replenisher liquid 210. Examples of the material of the replenisher tank 60 include glass, a polypropylene, a polyethylene, a Teflon (registered trademark) resin, and the like.

A material of the suction pipe 61 is not particularly limited as long as the material is stable with respect to the replenisher liquid 210. Examples of the material of the suction pipe 61 include glass, a polypropylene, a polyethylene, a Teflon (registered trademark) resin, and the like.

Examples of the controller 70 include a personal computer and the like.

Examples of the replenisher measurement unit 80 and the permeation liquid measurement unit 130 can include, but are not particularly limited to, a general balance which measures a weight of a liquid or a level gauge. Furthermore, flow meters may be provided in the middle of the third pipe 143 and the fourth pipe 144.

Examples of the first pressure sensor 90, the second pressure sensor 100, and the third pressure sensor 110 include, but are not particularly limited to, general pressure sensors which measure pressures of liquids.

The permeation liquid tank 130 has a space in which the permeation liquid 220 can be accommodated. A shape and a size of the permeation liquid tank 130 are not particularly limited as long as the permeation liquid 220 can be accommodated therein.

A material of the permeation liquid tank 130 is not particularly limited as long as the material is stable with respect to the permeation liquid 220. Examples of the material of the permeation liquid tank 130 include glass, a polypropylene, a polyethylene, a Teflon (registered trademark) resin, and the like.

The first pipe 141, the second pipe 142, the third pipe 143, and the fourth pipe 144 are not particularly limited as long as the materials are stable with respect to the process liquid 200, the replenisher liquid 210, and the permeation liquid 220. Examples of the materials of the first pipe 141, the second pipe 142, the third pipe 143, and the fourth pipe 144 include tubes and the like formed of silicone rubber, vinyl chloride, or a polyolefin.

Figure 3:
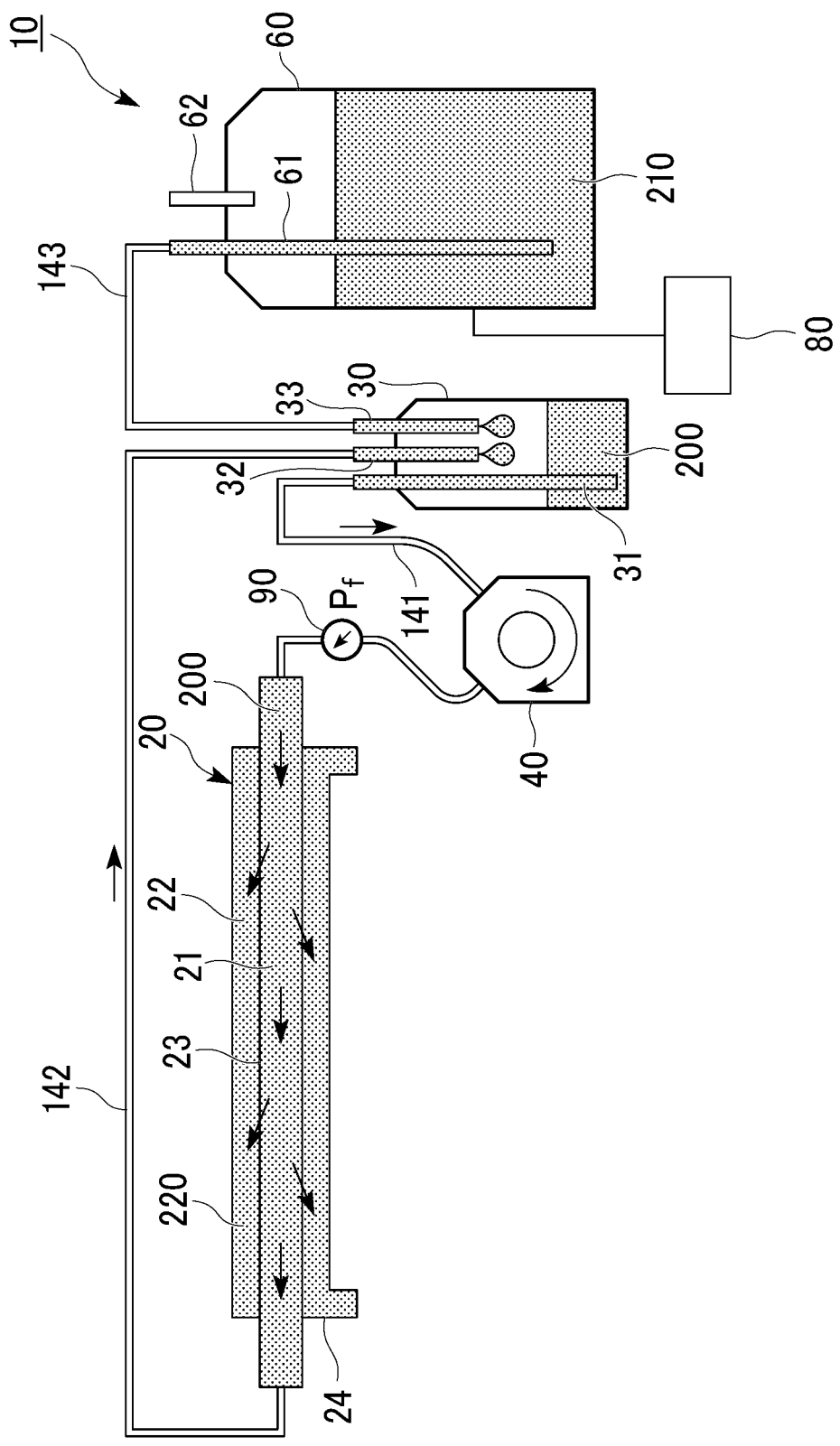
FIG. 3 is a schematic diagram showing a minimum constitution of a cross-flow filtration device according to the present invention.

FIG. 3 is a schematic diagram showing a minimum constitution of the cross-flow filtration device according to the present invention.

According to the cross-flow filtration device 10 in this example embodiment, for example, in the process of removing excess surfactant contained in the process liquid 200 in which the cross-flow filtration method which will be described later is performed, it is possible to efficiently determine the end of the removal process. Furthermore, according to the cross-flow filtration device 10 in this example embodiment, for example, when the cross-flow filtration method which will be described later is performed, a process liquid obtained by adjusting the amount of nanocarbons and a surfactant to a target amount with high accuracy is obtained.

[Cross-Flow Filtration Method]

The cross-flow filtration method in which the cross-flow filtration device 10 is used will be described and an action of the cross-flow filtration device 10 will be described with reference to FIG. 1.

The cross-flow filtration method in this example embodiment includes a step of causing the process liquid 200 to circulate to the inner chamber 21 in the filter module 20 and the process liquid tank 30 (hereinafter referred to as "Step A (ST1)") and a step of determining the end of circulation of the process liquid 200 in accordance with an amount of replenisher liquid supplied from the replenisher tank 60 to the process liquid tank 30 (hereinafter referred to as "Step B (ST2)").

In the cross-flow filtration method in this example embodiment, it is desirable that the process liquid 200 contain nanocarbons as a dispersoid, a surfactant as a dispersant, and a dispersion medium.

In the cross-flow filtration method in this example embodiment, nanocarbons refer to carbon materials mainly composed of carbon such as single-walled carbon nanotubes, double-walled carbon nanotubes, multi-walled carbon nanotubes, carbon nanohorns, carbon nanotwists, graphenes, and fullerenes. In the cross-flow filtration method in this example embodiment, a case in which excess surfactant is removed from the process liquid 200 containing single-walled carbon nanotubes as nanocarbons will be described in detail.

It is known that single-walled carbon nanotubes are divided into single-walled carbon nanotubes having two different properties, i.e., metallic single-walled carbon nanotubes and semiconducting single-walled carbon nanotubes in accordance with diameters of tubes and a winding method. If single-walled carbon nanotubes are synthesized using conventional manufacturing methods, single-walled carbon nanotube mixtures containing a metallic single-walled carbon nanotube having metallic properties and a semiconducting single-walled carbon nanotube having semiconductive properties in a statistical ratio of 1:2 are obtained.

The single-walled carbon nanotube mixtures are not particularly limited as long as the single-walled carbon nanotube mixtures contain a metallic single-walled carbon nanotube and a semiconducting single-walled carbon nanotube. Furthermore, the single-walled carbon nanotube in this example embodiment may be independently a single-walled carbon nanotube and may be a single-walled carbon nanotube in which carbon is partially substituted with an arbitrary functional group or a single-walled carbon nanotube modified with an arbitrary functional group.

The dispersion medium is not particularly limited as long as the dispersion medium can disperse a single-walled carbon nanotube mixture. Examples of the dispersion medium include water, heavy water, organic solvents, ionic liquids, and the like. Among these dispersion mediums, it is desirable that water or heavy water be used because then the quality of single-walled carbon nanotubes does not deteriorate.

Examples of the surfactant include non-ionic surfactants, cationic surfactants, anionic surfactants, and the like. In order to prevent ionic impurities such as sodium ions from entering single-walled nanotubes, it is desirable to utilize non-ionic surfactants.

As the non-ionic surfactant, non-ionic surfactants having a hydrophilic site in which ionization does not occur and a hydrophobic site such as an alkyl chain are used. Examples of such non-ionic surfactants include non-ionic surfactants having a polyethylene glycol structure represented by a polyoxyethylene alkyl ether type.

As such non-ionic surfactants, it is desirable that a polyoxyethylene alkyl ether represented by the following Expression (1) be used:

$$C_nH_{2n}(OCH_2CH_2)_mOH \tag{1}$$

(where, n=12 to 18 and m=20 to 100).

Examples of the polyoxyethylene alkyl ether represented by the foregoing Expression (1) include polyoxyethylene (23) lauryl ether (trade name: Brij L23; manufactured by Sigma-Aldrich), polyoxyethylene (20) cetyl ether (trade name: Brij C20; manufactured by Sigma-Aldrich), polyoxyethylene (20) stearyl ether (trade name: Brij S20; manufactured by Sigma-Aldrich), polyoxyethylene (20) oleyl ether (trade name: Brij O20; manufactured by Sigma-Aldrich), polyoxyethylene (100) stearyl ether (trade name: Brij S100; manufactured by Sigma-Aldrich), and the like.

As the non-ionic surfactant, polyoxyethylenesorbitan monostearate (molecular expression: $C_{64}H_{126}O_{26}$; trade name: Tween 60; manufactured by Sigma-Aldrich), polyoxyethylene sorbitan trioleate (molecular Expression: $C_{24}H_{44}O_6$; trade name: Tween 85; manufactured by Sigma-Aldrich), octylphenol ethoxylate (molecular Expression: $C_{14}H_{22}O(C_2H_4O)_n$; n=1 to 10; trade name: Triton X-100; manufactured by Sigma-Aldrich), polyoxyethylene (40) isooctyl phenyl ether (molecular Expression: $C_8H_{17}C_6H_{40}(CH_2CH_{20})_{40}H$; trade name: Triton X-405; manufactured by Sigma-Aldrich), poloxamer (molecular Expression: $C_5H_{10}O_2$; trade name: Pluronic; manufactured by Sigma-Aldrich), polyvinylpyrrolidone (molecular Expression: $(C_6H_9NO)_n$; n=5 to 100; manufactured by Sigma-Aldrich), and the like can also be used.

A method for preparing a process liquid containing nanocarbons and a surfactant is not particularly limited and a well-known method may be used as the method. For example, a method for subjecting a mixed liquid of a single-walled carbon nanotube mixture and a dispersion medium containing a surfactant to ultrasonic treatment to disperse the single-walled carbon nanotube mixture in the dispersion medium are exemplary examples.

In the cross-flow filtration method in this example embodiment, as the process liquid containing the nanocarbons and the surfactant, for example, it is desirable that a single-walled carbon nanotube mixture be separated into metallic single-walled nanotubes and semiconducting single-walled nanotubes through a free flow electrophoresis method, and a process liquid having a relatively large amount of metallic single-walled nanotubes or a process liquid having a relative large amount of semiconducting single-walled nanotubes be used. In this way, it is possible to efficiently prepare a process liquid containing an appropriate amount of metallic single-walled nanotubes or semiconducting single-walled nanotubes.

In Step A, the pump 40 is started, the supply of the process liquid 200 from the process liquid tank 30 to the inner chamber 2 in the filter module 20 starts, and the process liquid 200 is caused to circulate to the inner chamber 21 in the filter module 20 and the process liquid tank 30.

While the process liquid 200 is caused to circulate, the first pressure sensor 90 measures a pressure of the process liquid 200 in the inner chamber 21 on the inlet side thereof in the filter module 20. Furthermore, while the process liquid 200 is caused to circulate, the second pressure sensor 100 measures a pressure of the process liquid 200 in the inner chamber 21 on the outlet side thereof in the filter module 20. In addition, the third pressure sensor 110 measures a pressure of the permeation liquid 220 which has passed through the semipermeable membrane 23 in the outer chamber 22 on the drain port 24 side in the filter module 20.

The pressure regulator 50 adjusts the pressure of the process liquid 200 and the pressure of the permeation liquid 220 so that the pressure of the process liquid 200 which has passed through the inner chamber 21 in the filter module 20 is a predetermined constant pressure on the basis of the measurement results of the pressure of the process liquid 200 in the first pressure sensor 90, the pressure of the process liquid 200 in the second pressure sensor 100, and the pressure of the permeation liquid 220 in the third pressure sensor 110.

Also, it is desirable that the cross-flow filtration method in this example embodiment include a step of adjusting an amount of the process liquid 200 supplied into the inner chamber 21 in the filter module 20 using the pump 40 on the basis of the measurement results of the pressure of the process liquid 200 in the first pressure sensor 90, the pressure of the process liquid 200 in the second pressure sensor 100, and the pressure of the permeation liquid 220 in the third pressure sensor 110 (hereinafter referred to as "Step C"). Normally, although a processing pressure is adjusted by operating the pressure regulator 50, when the processing pressure exceeds an adjustment range in the pressure regulator 50 or when a sudden change in pressure which the pressure regulator 50 cannot handle occurs, the supply of the process liquid 200 into the inner chamber 21 in the filter module 20 using the pump 40 temporarily stops, and thus an excessive pressure being applied to the semipermeable membrane 23, and occurrence of damage are prevented.

If Step A and Step C are continuously performed, among components contained in the process liquid 200, components such as surfactant molecules having smaller diameters than the fine pore diameter of the semipermeable membrane 23 gradually pass through the semipermeable membrane 23 together with the dispersion medium and enter the outer chamber 22 in the filter module 20. Components such as nanocarbons having larger diameters than the fine pore diameter of the semipermeable membrane 23 remain in the inner chamber 21 in the filter module 20.

In the cross-flow filtration method in this example embodiment, the dispersion medium containing the components which have passed through the semipermeable membrane 23 is a permeation liquid 220. In the cross-flow filtration method in this example embodiment, the permeation liquid 220 includes the above-described surfactant and the above-described dispersion medium.

Also, the permeation liquid 220 which has entered the outer chamber 22 in the filter module 20 is drained from the outer chamber 22 to the permeation liquid tank 120 via drain port 24.

In this way, if the permeation liquid 220 is drained from the outer chamber 22 in the filter module 20 to the permeation liquid tank 120, an amount of the process liquid 200 circulating through the inner chamber 21 in the filter module 20 and the process liquid tank 30 decreases. As described above, since the process liquid tank 30 is airtight, if the amount of the process liquid 200 circulating through the inner chamber 21 in the filter module 20 and the process liquid tank 30 decreases, a pressure inside the process liquid tank 30 decreases. Then, the replenisher liquid 210 is automatically supplied (replenished) from the replenisher tank 60 to the process liquid tank 30. Thus, the amount of the process liquid 200 circulating through the inner chamber 21 in the filter module 20 and the process liquid tank 30 is kept constant.

In the cross-flow filtration method in this example embodiment, the above-described dispersion medium is used as the replenisher liquid 210. Therefore, if the replenisher liquid 210 is supplied from the replenisher tank 60 to the process liquid tank 30, the amount of the surfactant relative to the nanocarbons in the process liquid 200 is relatively reduced.

In Step B, the end of circulation of the process liquid 200 is determined on the basis of the measurement result of the amount of the replenisher liquid 210 supplied from the replenisher tank 60 to the process liquid tank 30.

In Step B, the replenisher measurement unit 80 measures an amount of the replenisher liquid 210 supplied from the replenisher tank 60 to the process liquid tank 30. The replenisher measurement unit 80 measures an amount of the replenisher liquid 210 inside the replenisher tank 60 and a change in amount (a flow rate) of the replenisher tank 60 per unit time. The end of circulation of the process liquid 200 is determined on the basis of the measurement results of the amount of the replenisher liquid 210. Moreover, the pump 40 stops and circulation of the process liquid 200 to the inner chamber 21 in the filter module 20 and the process liquid tank 30 ends. That is to say, in Step B, if a flow rate of the replenisher liquid 210 reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends. The predetermined value of the flow rate of the replenisher liquid 210 is a value at which the amount of the surfactant in the process liquid 200 is a target amount. Furthermore, the over processing time is an additional processing time required for reliably ensuring that the amount of the surfactant in the process liquid 200 is a predetermined concentration or less. In addition, the over processing time is set so that the amount of the surfactant in the process liquid 200 does not fall below a lower limit of an allowable amount.

The amounts of the nanocarbons and the surfactant in the process liquid 200 obtained when the circulation of the process liquid 200 ends have target amounts.

Also, the cross-flow filtration device of the present invention measures the amount of the replenisher liquid 210 inside the replenisher tank 60 in the replenisher measurement unit 80. In the cross-flow filtration process, the amount of the replenisher liquid 210 decreases. When the amount of the replenisher liquid 210 which has been prepared when the process starts is not a sufficient amount, the replenisher liquid 210 becomes depleted during processing, and as a result, the process liquid 200 becomes depleted in some cases. The cross-flow filtration device of the present invention measures the amount of the replenisher liquid 210 to stop the pump 40 when an amount of the replenisher liquid 210 remaining is extremely low so that circulation of the process liquid 200 to the inner chamber 21 in the filter module 20 and the process liquid tank 30 temporarily stops, and thus it is possible to prevent the above-described failures in advance.

Also, in the cross-flow filtration method in this example embodiment, the end of circulation of the process liquid 200 may be determined on the basis of the measurement results of the amount of the permeation liquid 220 in the permeation liquid measurement unit 130 so that the pump 40 stops and the end of circulation of the process liquid 200 to the inner chamber 21 in the filter module 20 and the process liquid tank 30. The permeation liquid measurement unit 130 measures an amount of the permeation liquid 220 drained through the drain port 24 of the filter module 20. The permeation liquid measurement unit 130 measures an amount of the permeation liquid 220 inside the permeation liquid tank 120 and a change in amount (a flow rate) of the permeation liquid tank 120 per unit time. In the permeation liquid measurement unit 130, if a flow rate of the permeation liquid 220 reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends. The predetermined value of the flow rate of the permeation liquid 220 is a value at which the amount of the surfactant in the process liquid 200 is a target amount. Furthermore, the over processing time is an additional processing time required for reliably ensuring that the amount of the surfactant in the process liquid 200 is a predetermined concentration or less. In addition, the over processing time is set so that the amount of the surfactant in the process liquid 200 does not fall below a lower limit of an allowable amount.

Also, in the cross-flow filtration method in this example embodiment, in Step B, the flow rate of the replenisher liquid 210 is corrected on the basis of the measurement results of a transmembrane pressure (TMP) between the inner chamber 21 and the outer chamber 22 in the filter module 20 defined by the following Expression (1) and the end of circulation of the process liquid 200 is determined on the basis of the measurement results of the flow rate of the replenisher liquid 210 obtained through the correction:

$$\text{TMP}=(P_f+P_r)/2-P_p \quad (1)$$

(here, TMP indicates a transmembrane pressure (TMP) between the inner chamber 21 and the outer chamber 22 in the filter module 20, $P_f$ indicates a pressure of the process liquid 200 in the inner chamber 21 on the inlet side thereof in the filter module 20, $P_r$ indicates a pressure of the process liquid 200 in the inner chamber 21 on the outlet side thereof in the filter module 20, and $P_p$ indicates a pressure of the permeation liquid 220 in the outer chamber 22 on the drain port 24 side in the filter module 20).

That is to say, if the flow rate of the replenisher liquid 210 obtained through the correction reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends.

Also, although a case in which a flow rate of a replenisher liquid is corrected using the transmembrane pressure (TMP) calculated from the foregoing Expression (1) has been described above, the same effect is obtained even if the flow rate of a replenisher liquid is corrected using the pressure ($P_f$) in the inner chamber 21 on the inlet side thereof, a pressure average value of $(P_f)$ on the inlet side and the pressure $(P_r)$ on the outlet side in the inner chamber 21, or the like.

Also, in the cross-flow filtration method in this example embodiment, in Step B, the flow rate of the permeation liquid 220 is corrected on the basis of the measurement results of the transmembrane pressure (TMP) between the inner chamber 21 and the outer chamber 22 in the filter module 20 defined by the foregoing Expression (1) and the end of circulation of the process liquid 200 may be determined on the basis of the measurement results of the flow rate of the permeation liquid 220 obtained through the correction.

That is to say, if the flow rate of the permeation liquid 220 obtained through the correction reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends.

Also, although a case in which the flow rate of the permeation liquid is corrected using the transmembrane pressure (TMP) calculated from the foregoing Expression (1) has been described above, the same effect is obtained even if the flow rate of the permeation liquid is corrected using the pressure $(P_f)$ in the inner chamber 21 on the inlet side thereof, a pressure average value of $(P_f)$ on the inlet side and the pressure $(P_r)$ on the outlet side in the inner chamber 21, or the like.

According to the cross-flow filtration method in which the cross-flow filtration device 10 in this example embodiment is used, in the process of removing excess surfactant contained in the process liquid 200, it is possible to efficiently determine the end of the removal process. Furthermore, according to the cross-flow filtration method in which the cross-flow filtration device 10 in this example embodiment is used, a process liquid in which the amounts of the nanocarbons and the surfactant are adjusted to target amounts with high accuracy is obtained.

Although a case in which the process liquid 200 contains the nanocarbons, the surfactant, and the dispersion medium has been provided as an exemplary example in the cross-flow filtration method in this example embodiment, the cross-flow filtration method in this example embodiment is not limited thereto. The cross-flow filtration method in this example embodiment can also be applied to protein and cell concentrations and pure water production.

Second Example Embodiment (Cross-Flow Filtration Device)

Figure 4:
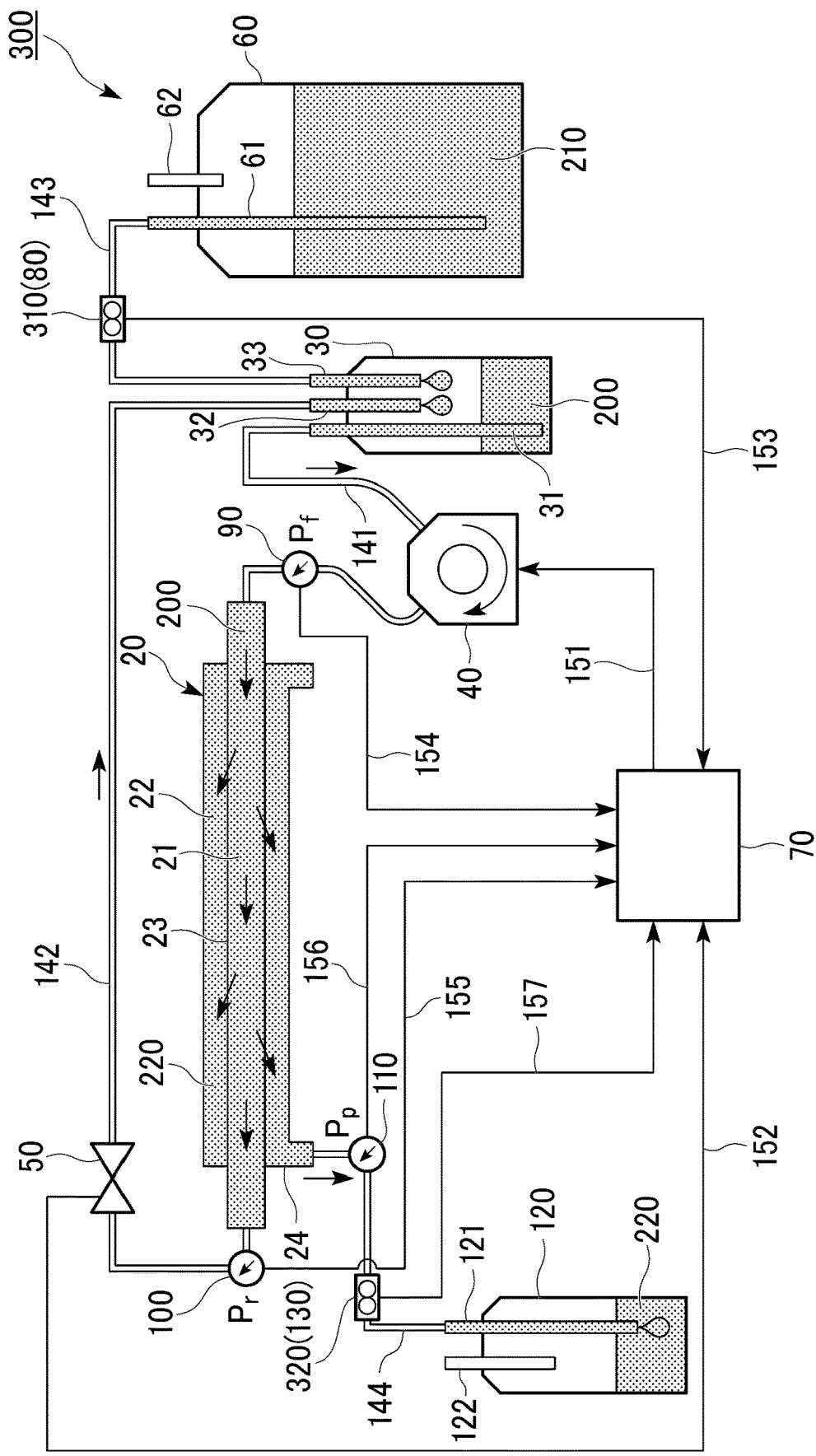
FIG. 4 is a schematic diagram showing a cross-flow filtration device according to a second example embodiment.

FIG. 4 is a schematic diagram showing a cross-flow filtration device according to this example embodiment. Constituent elements in FIG. 4 that are the same as those of the cross-flow filtration device according to the first example embodiment shown in FIG. 1 will be denoted with the same reference numeral as in FIG. 1 and a repeated description will be omitted.

A cross-flow filtration device 300 in this example embodiment includes a filter module 20, a process liquid tank 30, a pump 40, a pressure regulator 50, a replenisher tank 60, a controller 70, a replenisher measurement unit 80, a first pressure sensor 90 $(P_f)$, a second pressure sensor 100 $(P_r)$, and a third pressure sensor 110 $(P_p)$. Furthermore, the cross-flow filtration device 300 in this example embodiment may include a permeation liquid tank 120 and a permeation liquid measurement unit 130.

In the cross-flow filtration device 300 in this example embodiment, as in the cross-flow filtration device 10 in the first example embodiment, an amount of a permeation liquid 220 drained from the filter module 20 is equal to an amount of a replenisher liquid 210 replenished from the replenisher tank 60 to the process liquid tank 30. Furthermore, an amount of the permeation liquid 220 (a flow rate of the permeation liquid 220) per unit time is also approximately equal to an amount of the replenisher liquid 210 (a flow rate of the replenisher liquid 210) per unit time.

The controller 70 is electrically connected to the replenisher measurement unit 80 via a cable 153.

Also, the controller 70 is electrically connected to the permeation liquid measurement unit 130 via a cable 157.

The replenisher measurement unit 80 is a flow meter configured to measure a flow volume of the replenisher liquid 210 supplied from the replenisher tank 60 to the process liquid tank 30. In this example embodiment, the replenisher measurement unit 80 is also referred to as a first flow meter 310. The first flow meter 310 measures a flow volume (a flow rate) of the replenisher liquid 210 supplied from the replenisher tank 60 to the process liquid tank 30 per unit time.

The first flow meter 310 is provided in the middle of a third pipe 143.

The permeation liquid measurement unit 130 is a flow meter configured to measure a flow volume of the permeation liquid 220 drained through the drain port 24. In this example embodiment, the permeation liquid measurement unit 130 is also referred to as a second flow meter 320. The second flow meter 320 measures a flow volume (a flow rate) of the permeation liquid 220 drained through the drain port 24 per unit time.

The second flow meter 320 is provided in the middle of a fourth pipe 144.

The first flow meter 310 and the second flow meter 320 are not particularly limited and examples thereof include a general flow meter configured to measure a flow volume of a liquid.

According to the cross-flow filtration device 300 in this example embodiment, for example, it is possible to carry out a cross-flow filtration method which will be described later. In addition, in a method for removing an excessive surfactant contained in the process liquid 200, it is possible to efficiently determine the end of the removal process. Furthermore, according to the cross-flow filtration device 300 in this example embodiment, for example, it is possible to carry out the cross-flow filtration method which will be described later and a process liquid in which the amounts of the nanocarbons and the surfactant are adjusted to target amounts with high accuracy is obtained.

[Cross-Flow Filtration Method]

The cross-flow filtration method in which the cross-flow filtration device 300 is used will be described and an action of the cross-flow filtration device 300 will be described with reference to FIG. 4.

The cross-flow filtration method in this example embodiment includes a step of causing the process liquid 200 to circulate to an inner chamber 21 in the filter module 20 and the process liquid tank 30 (Step A) and a step of determining the end of circulation of the process liquid 200 in accordance with an amount of replenisher liquid supplied from the replenisher tank 60 to the process liquid tank 30 (Step B).

In Step A, as in the cross-flow filtration method in the first example embodiment, the pump 40 starts, the supply of the process liquid 200 from the process liquid tank 30 to the inner chamber 21 in the filter module 20 starts, and the process liquid 200 is caused to circulate to the inner chamber 21 in the filter module 20 and the process liquid tank 30.

Also, it is desirable that the cross-flow filtration method in this example embodiment include a step of adjusting an amount of the process liquid 200 supplied to the inner chamber 21 in the filter module 20 using the pump 40 on the basis of the measurement results of a pressure of the process liquid 200 in the first pressure sensor 90, a pressure of the process liquid 200 in the second pressure sensor 100, and a pressure of the permeation liquid 220 in the third pressure sensor 110 (Step C), as in the cross-flow filtration method in the first example embodiment.

If Step A and Step C are continuously performed, among components contained in the process liquid 200, components having smaller diameters than a fine pore diameter of a semipermeable membrane 23 gradually pass through the semipermeable membrane 23 together with a dispersion medium and enter an outer chamber 22 in the filter module 20.

In the cross-flow filtration method in this example embodiment, the dispersion medium containing the components which have passed through the semipermeable membrane 23 is the permeation liquid 220. In the cross-flow filtration method in this example embodiment, the permeation liquid 220 includes the above-described surfactant and the above-described dispersion medium.

The permeation liquid 220 which has entered the outer chamber 22 in the filter module 20 is drained from the outer chamber 22 to the permeation liquid tank 120 through the drain port 24.

Also, in the cross-flow filtration method in this example embodiment, the replenisher liquid 210 is automatically supplied (replenished) from the replenisher tank 60 to the process liquid tank 30, as in the cross-flow filtration method in the first example embodiment. Thus, an amount of the process liquid 200 circulating through the inner chamber 21 in the filter module 20 and the process liquid tank 30 is kept constant.

In Step B, it is desirable that the end of circulation of the process liquid 200 be determined on the basis of the measurement results of a flow volume of the replenisher liquid 210 supplied from the replenisher tank 60 to the process liquid tank 30.

In Step B, the first flow meter 310 measures a flow rate of the replenisher liquid 210 supplied from the replenisher tank 60 to the process liquid tank 30. The end of circulation of the process liquid 200 is determined on the basis of the measurement results of the flow rate of the replenisher liquid 210. Moreover, the pump 40 stops and circulation of the process liquid 200 to the inner chamber 21 in the filter module 20 and the process liquid tank 30 ends. That is to say, in Step B, if the flow rate of the replenisher liquid 210 reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends. The predetermined value of the flow rate of the replenisher liquid 210 is a value at which the amount of the surfactant in the process liquid 200 is a target amount. Furthermore, the over processing time is an additional processing time required for reliably ensuring that the amount of the surfactant in the process liquid 200 is a predetermined concentration or less. In addition, the over processing time is set so that the amount of the surfactant in the process liquid 200 does not fall below a lower limit of an allowable amount.

The amounts of the nanocarbons and the surfactant in the process liquid 200 obtained when the circulation of the process liquid 200 ends are target amounts.

Also, the cross-flow filtration method in this example embodiment may determine the end of circulation of the process liquid 200 on the basis of the measurement results of a flow volume of the permeation liquid 220 in the second flow meter 320 so that the pump 40 stops and circulation of the process liquid 200 to the inner chamber 21 in the filter module 20 and the process liquid tank 30 ends. The second flow meter 320 measures the flow rate of the permeation liquid 220 drained through the drain port 24 of the filter module 20. In the second flow meter 320, if the flow rate of the permeation liquid 220 reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends. The predetermined value of the flow rate of the permeation liquid 220 is a value at which the amount of the surfactant in the process liquid 200 is a target amount. Furthermore, the over processing time is an additional processing time required for reliably ensuring that the amount of the surfactant in the process liquid 200 is a predetermined concentration or less. In addition, the over processing time is set so that the amount of the surfactant in the process liquid 200 does not fall below a lower limit of an allowable amount.

Also, in the cross-flow filtration method in this example embodiment, in Step B, the flow rate of the replenisher liquid 210 is corrected on the basis of the measurement results of a transmembrane pressure (TMP) between the inner chamber 21 and the outer chamber 22 in the filter module 20 defined by the following Expression (1) and it is desirable that circulation of the process liquid 200 end on the basis of the measurement results of the flow rate of the replenisher liquid 210 obtained through the correction:

$$TMP=(P_f+P_r)/2-P_p \quad (1)$$

(here, TMP indicates a transmembrane pressure (TMP) between the inner chamber 21 and the outer chamber 22 in the filter module 20, $P_f$ indicates a pressure of the process liquid 200 in the inner chamber 21 on an inlet side thereof in the filter module 20, $P_r$ indicates a pressure of the process liquid 200 in the inner chamber 21 on an outlet side thereof in the filter module 20, and $P_p$ indicates a pressure of the permeation liquid 220 in the outer chamber 22 on the drain port 24 side in the filter module 20).

That is to say, if the flow rate of the replenisher liquid 210 obtained through the correction reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends.

Also, although a case in which the flow rate of the replenisher liquid is corrected using the transmembrane pressure (TMP) calculated from the foregoing Expression (1) has been described above, the same effect is obtained even if the flow rate of a replenisher liquid is corrected using the pressure ($P_f$) in the inner chamber 21 on the inlet side thereof, a pressure average value of ($P_f$) on the inlet side and the pressure ($P_r$) on the outlet side in the inner chamber 21, or the like.

Also, in the cross-flow filtration method in this example embodiment, in Step B, the flow rate of the permeation liquid 220 may be corrected on the basis of the measurement results of the transmembrane pressure (TMP) between the inner chamber 21 and the outer chamber 22 the filter module 20 defined by the foregoing Expression (1) and the end of circulation of the process liquid 200 may be determined on the basis of the measurement results of the flow rate of the permeation liquid 220 obtained through the correction.

That is to say, if the flow rate of the permeation liquid 220 obtained through the correction reaches a predetermined value, the end of circulation of the process liquid 200 is determined. In addition, after a predetermined over processing time has elapsed, the pump 40 stops and circulation of the process liquid 200 to the inner chamber 21 in the filter module 20 and the process liquid tank 30 ends.

Also, although a case in which the flow rate of the permeation liquid is corrected using the transmembrane pressure (TMP) calculated from the foregoing Expression (1) has been described above, the same effect is obtained even if the flow rate of a permeation liquid is corrected using the pressure ($P_f$) in the inner chamber 21 on the inlet side thereof, a pressure average value of ($P_f$) on the inlet side and the pressure ($P_r$) on the outlet side in the inner chamber 21, or the like.

According to the cross-flow filtration method in which the cross-flow filtration device 300 in this example embodiment is used, in a process of removing an excessive surfactant contained in the process liquid 200, it is possible to efficiently determine the end of the removal process. Furthermore, according to the cross-flow filtration method in which the cross-flow filtration device 300 in this example embodiment is used, a process liquid obtained by adjusting the amount of nanocarbons and a surfactant to a target amount with high accuracy is obtained.

Although a case in which the process liquid 200 contains the nanocarbons, the surfactant, and the dispersion medium has been provided as an exemplary example in the cross-flow filtration method in this example embodiment, the cross-flow filtration method in this example embodiment is not limited. The cross-flow filtration method in this example embodiment can also be applied to protein and cell concentration and pure water production.

Figure 5:
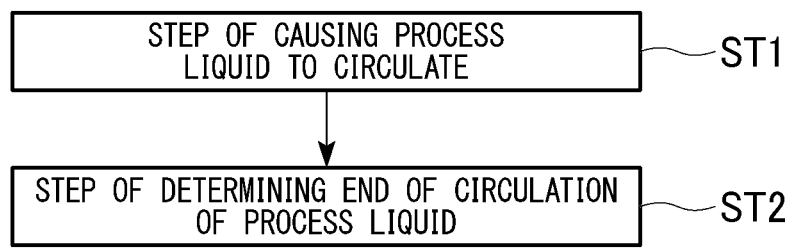
FIG. 5 is a flowchart for describing a cross-flow filtration method according to the present invention.

FIG. 5 shows a flowchart for describing the cross-flow filtration method of the present invention.

WORKING EXAMPLES

Although the present invention will be described in more detail below using experimental examples, the present invention is not limited to the following experimental examples.

Experimental Example 1

A solution A1 obtained by dissolving 0.01 wt % of polyoxyethylene (100) stearyl ether (trade name: Brij S100; manufactured by Sigma-Aldrich) which is a non-ionic surfactant in pure water (water), a solution B1 obtained by dissolving 0.1 wt % of polyoxyethylene (100) stearyl ether (trade name: Brij S100; manufactured by Sigma-Aldrich) in pure water (water), and a solution C1 obtained by dissolving 2 wt % of polyoxyethylene (100) stearyl ether (trade name: Brij S100; manufactured by Sigma-Aldrich) in pure water (water) were prepared.

The solution A1, the solution B1, and the solution C1 had amounts of 20 mL.

A cross-flow filtration process of the solution A1, the solution B1, and the solution C1 was performed using the cross-flow filtration device 10 shown in FIG. 1.

As the filter module 20, a filter module including the semipermeable membrane 23 having a fine pore size of 750 kDa and an area of 20 cm$^2$ was used.

A pressure ($P_f$) of the solution A1, the solution B1, and the solution C1 in the inner chamber 21 on the inlet side thereof in the filter module 20 was 20 kPa.

As a replenisher liquid, pure water was used.

In the cross-flow filtration process, an amount of the replenisher liquid to be consumed was measured with the progress of processing time. The results are shown in FIG. 6.

Figure 6:
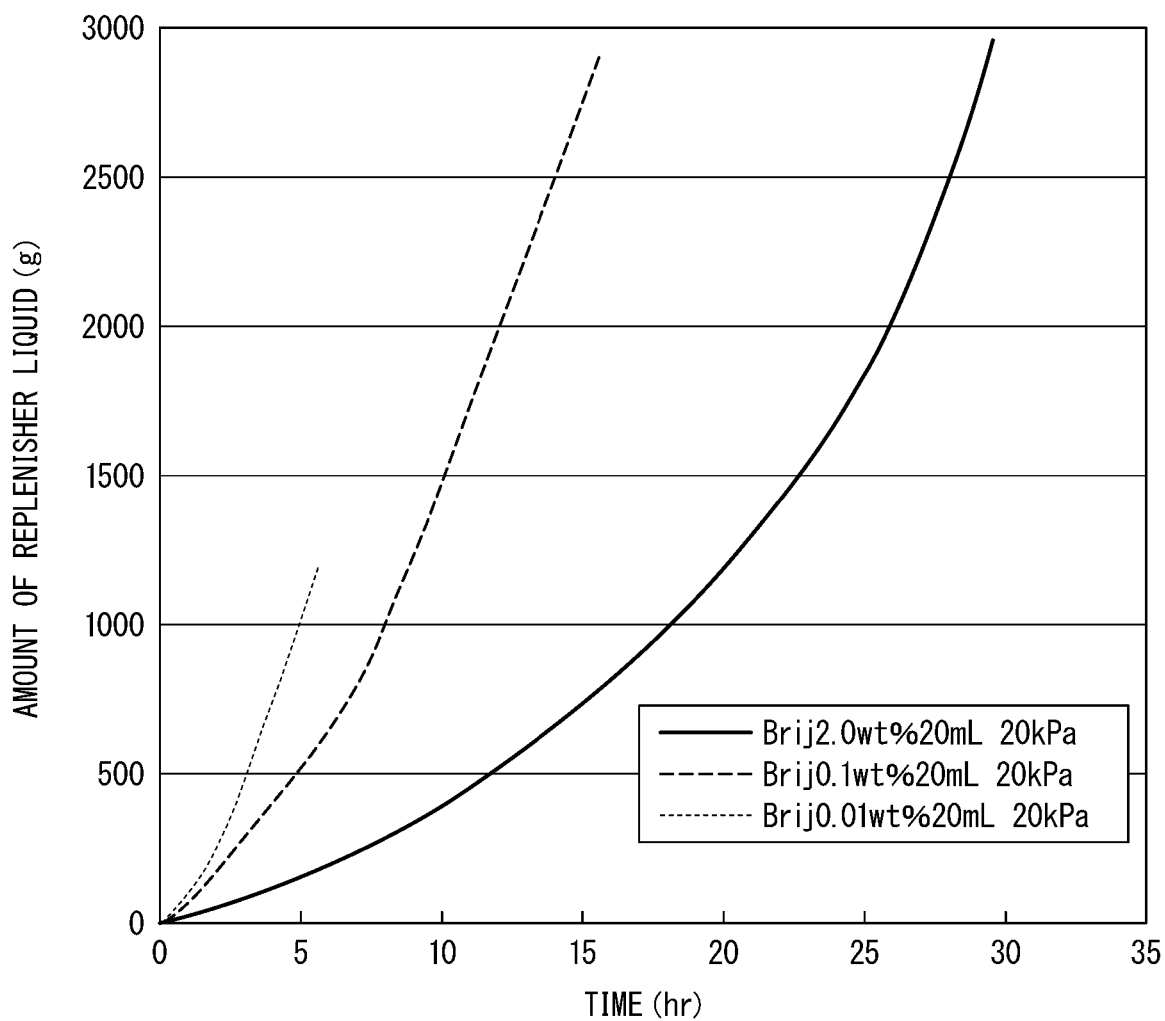
FIG. 6 is a diagram showing a relationship between a processing time and an amount of a replenisher liquid to be consumed in a cross-flow filtration process in Experimental Example 1.

It was confirmed from the results in FIG. 6 that a slope of the amount of the replenisher liquid to be consumed increased with the progress of processing time.

Figure 7:
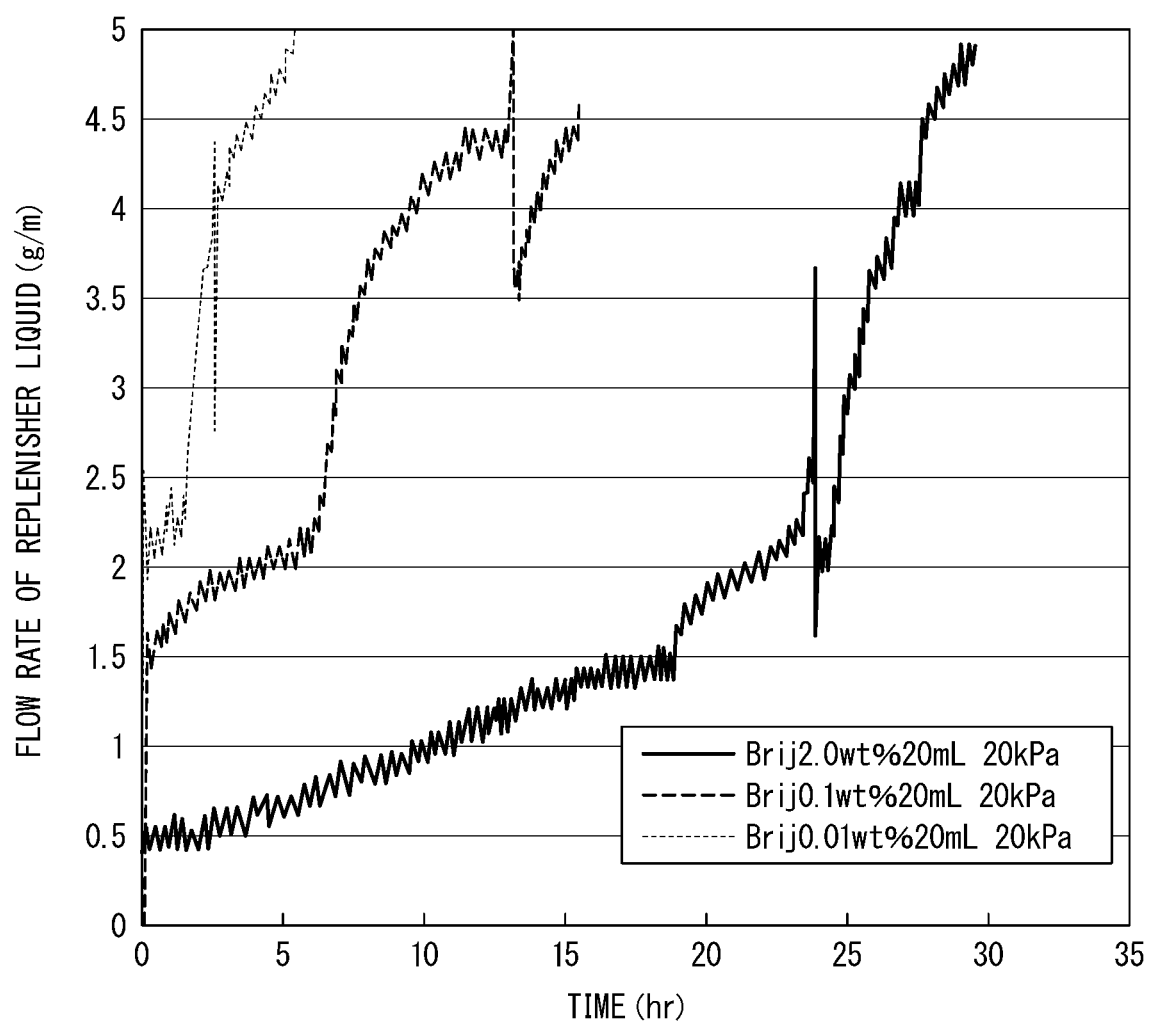
FIG. 7 is a diagram showing a relationship between a processing time and a flow rate of a replenisher liquid in the cross-flow filtration process in Experimental Example 1.

First, an amount of replenisher liquid to be consumed per unit time was obtained from the amount of the replenisher liquid to be consumed in FIG. 6 and a flow rate of the replenisher liquid was calculated. FIG. 7 shows a relationship between the processing time and the flow rate of the replenisher liquid.

It was confirmed from the results in FIG. 7 that, when the solution C1 (an aqueous solution having Brij S100 with the amount of 2 wt %) was used, a flow rate of the replenisher liquid immediately after the process started was about 0.5 g/m and the flow rate of the replenisher liquid increased with the progress of processing time. Furthermore, it was confirmed that, when the solution B1 (an aqueous solution having Brij S100 with the amount of 0.1 wt %) was used, a flow rate of the replenisher liquid immediately after the process started was about 1.5 g/m and the flow rate of the replenisher liquid increased with the progress of processing time. In addition, it was confirmed that, when the solution A1 (an aqueous Brij S100 solution with the amount of 0.01 wt %) was used, a flow rate of the replenisher liquid immediately after the process started was about 2.1 g/m and the flow rate of the replenisher liquid increased with the progress of processing time. It was found from the above results that the flow rate of the replenisher liquid immediately after the process started increased as the amount of the non-ionic surfactant in the solution decreased.

Figure 8:
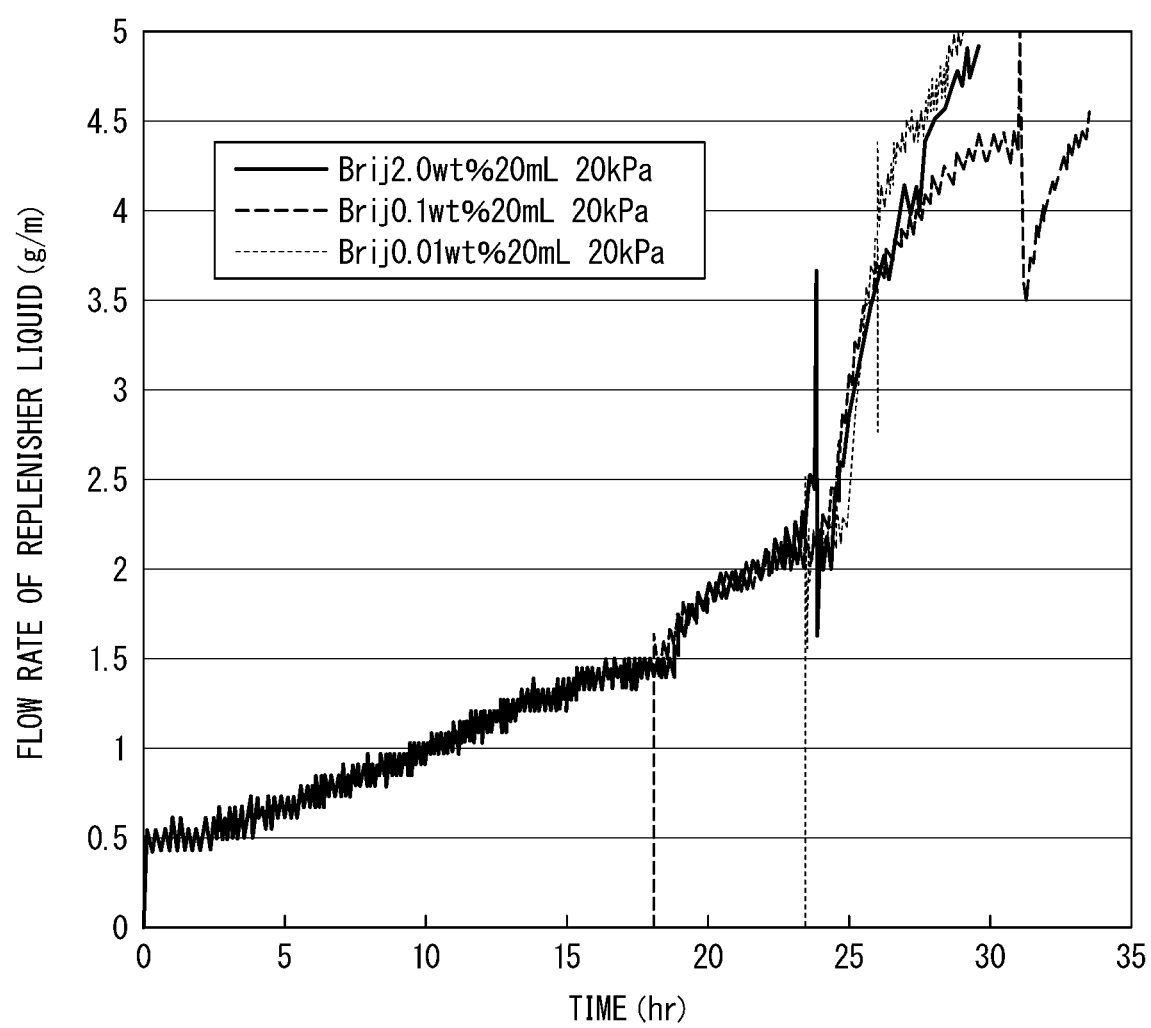
FIG. 8 is a diagram showing a relationship between a processing time and a flow rate of a replenisher liquid in the cross-flow filtration process in Experimental Example 1.

Here, if a graph showing a relationship between the flow rate of the replenisher liquid and the processing time when the solution A1 was used which had been offset by 23.5 hours and a graph showing a relationship between the flow rate of the replenisher liquid and the processing time when the solution B1 was used which had been offset by 18 hours was shown, as shown in FIG. 8, it was found that three graphs substantially overlapped.

Figure 9:
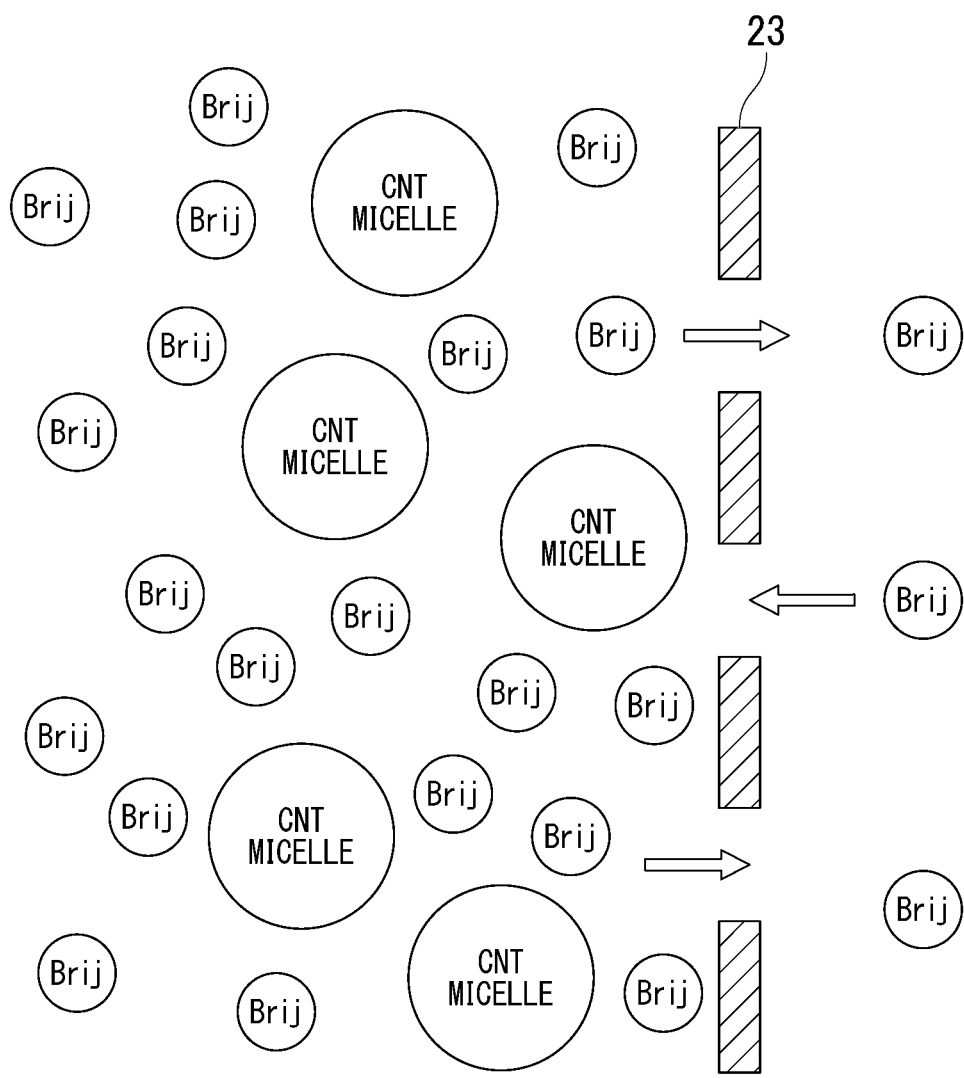
FIG. 9 is a schematic diagram showing a state of a non-ionic surfactant which passes through a semipermeable membrane in a filter module.

A flow rate of a permeation liquid containing a non-ionic surfactant (Brij S100) passing through the semipermeable membrane 23 in the filter module 20 significantly depends on a pressure (an applied pressure) applied to the semipermeable membrane 23. Furthermore, since the semipermeable membrane 23 has a reverse osmotic pressure ($\pi = CRT$) occurs therein in accordance with the number of particles (the number of particles of the non-ionic surfactant) inside the semipermeable membrane 23, an effective pressure applied to the semipermeable membrane 23 corresponds to a difference between the applied pressure and the osmotic pressure (refer to FIG. 9).

For example, if all molecules contributed to an osmotic pressure in the solution C1 (an aqueous Brij S100 solution with the amount of 2 wt %), an osmotic pressure at T=300 k was calculated as 10.6 kPa from the foregoing expression. Here, R=8.31×10$^3$ L·Pa/K·mol and C=4.3 m mol/L (2 wt % Brij S100) were set. Therefore, when a molecular concentration of Brij S100 inside the semipermeable membrane 23 is high, an effective pressure applied to the semipermeable membrane 23 is reduced by an amount corresponding to the osmotic pressure and a rate at which surfactant molecules are drained from the inner chamber 21 to the outer chamber 22 in the filter module 20 together with the dispersion medium (pure water) is reduced. On the other hand, when the molecular concentration of the Brij S100 inside the semipermeable membrane 23 is reduced, the effective pressure applied to the semipermeable membrane 23 increases, the surfactant molecules are easily drained from the inner chamber 21 to the outer chamber 22 in the filter module 20 together with the dispersion medium, and a flow rate of the permeation liquid increases.

Therefore, knowing the flow rate of the permeation liquid is the same as knowing a concentration of particles in a processing solution and it is possible to accurately know a concentration of the surfactant in the solution by accurately measuring and calculating the flow rate of the permeation liquid.

Also, in the cross-flow filtration device of the present invention, since the amount of permeation liquid is equal to the amount of replenisher liquid or the amount of permeation liquid (the flow rate of the permeation liquid) per unit time is equal to the amount of the replenisher liquid (the flow rate of the replenisher liquid) per unit time, the change in flow rate of the permeation liquid with the change in osmotic pressure can be detected as the change in flow rate of the replenisher liquid. As a result, it is possible to accurately know a concentration of the surfactant in the solution by accurately measuring and calculating the flow rate of the replenisher liquid.

The graph showing the relationship between the processing time and the flow rate of the replenisher liquid shown in FIG. 8 shows the concentration dependence of Brij S100 inside the semipermeable membrane 23. The effective pressure applied to the semipermeable membrane 23, that is, the flow rate of the replenisher liquid depends on the molecular concentration of the solution inside the filter module 20. Therefore, referring to FIG. 8, after 18 hours when the solution C1 (an aqueous Brij S100 solution with the amount of 2 wt %) has been subjected to a cross-flow filtration process and a flow rate of a replenisher liquid has been about 1.5 g/m, the amount of Brij S100 in the solution inside the filter module 20 is about 0.1 wt %, substantially similar to that of the solution B1. Furthermore, it is found that after 23.5 hours when the flow rate of the replenisher liquid has been about 2.1 g/m, the amount of Brij S100 in the solution inside the filter module 20 is about 0.01 wt %, substantially similar to that of the solution C1.

According to the above-described cross-flow filtration process, if the flow rate at which the solution circulates, the pressure applied to the solution, the fine pore diameter of the semipermeable membrane 23, the area of the semipermeable membrane 23, and the volume of the filter module 20 are the same, the flow rate of the replenisher liquid does not depend on the concentration of the surfactant when the process starts and the amount of process liquid used for performing processing and is obtained by reflecting only the molecular concentration of the solution inside the filter module 20. Therefore, in the cross-flow filtration process under defined conditions, it is possible to know the concentration of the surfactant remaining and to remove the surfactant with high accuracy by measuring the flow rate of the replenisher liquid.

Experimental Example 2

A solution B2 obtained by dissolving 0.1 wt % of polyoxyethylene (100) stearyl ether (trade name: Brij S100; manufactured by Sigma-Aldrich) which is a non-ionic surfactant in pure water was prepared. The solution B2 had an amount of 20 mL.

A cross-flow filtration process was performed on three solutions B2 using the cross-flow filtration device 10 shown in FIG. 1.

Pressures ($P_f$) of the three solutions B2 in the inner chamber 21 on the outlet port side thereof in the filter module 20 were 15 kPa, 20 kPa, and 30 kPa.

Pure water was used as a replenisher liquid.

Figure 10:
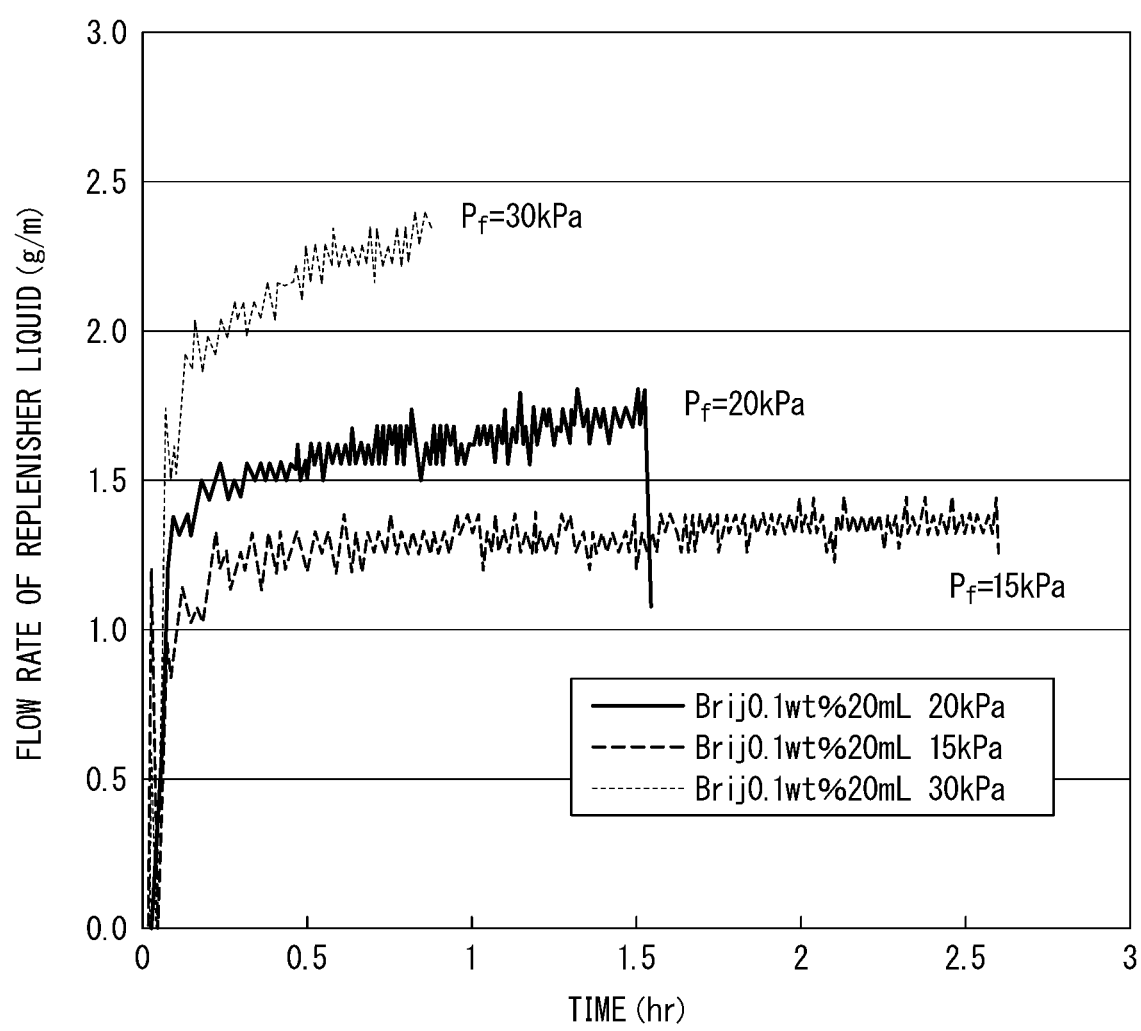
FIG. 10 is a diagram showing a relationship between a processing time and a flow rate of a replenisher liquid in a cross-flow filtration process in Experimental Example 2.

In the cross-flow filtration process, as a processing time had elapsed, an amount of replenisher liquid to be consumed was measured and an amount of replenisher liquid (a flow rate of the replenisher liquid) to be consumed per unit time was calculated. FIG. 10 shows a relationship between the processing time and the flow rate of the replenisher liquid.

From the results of FIG. 10, a flow rate of the replenisher liquid increases as a pressure ($P_f$) of a solution B2 in the inner chamber 21 on the inlet side thereof in the filter module 20 increases.

Here, a transmembrane pressure (TMP) between the inner chamber 21 and the outer chamber 22 in the filter module 20 is defined by the foregoing Expression (1). Furthermore, a normalized flow rate of the replenisher liquid is defined by the following Expression (2):

$$\text{Normalized flow rate of replenisher liquid} = \text{flow rate of replenisher liquid} \times (\text{standard TMP/TMP during processing}) \quad (2)$$

The standard TMP is 24 kPa which is a standard transmembrane pressure (TMP) when a pressure ($P_f$) of the solution B2 in the inner chamber 21 on the inlet side thereof in the filter module 20 of the cross-flow filtration device 10 is 20 kPa.

Figure 11:
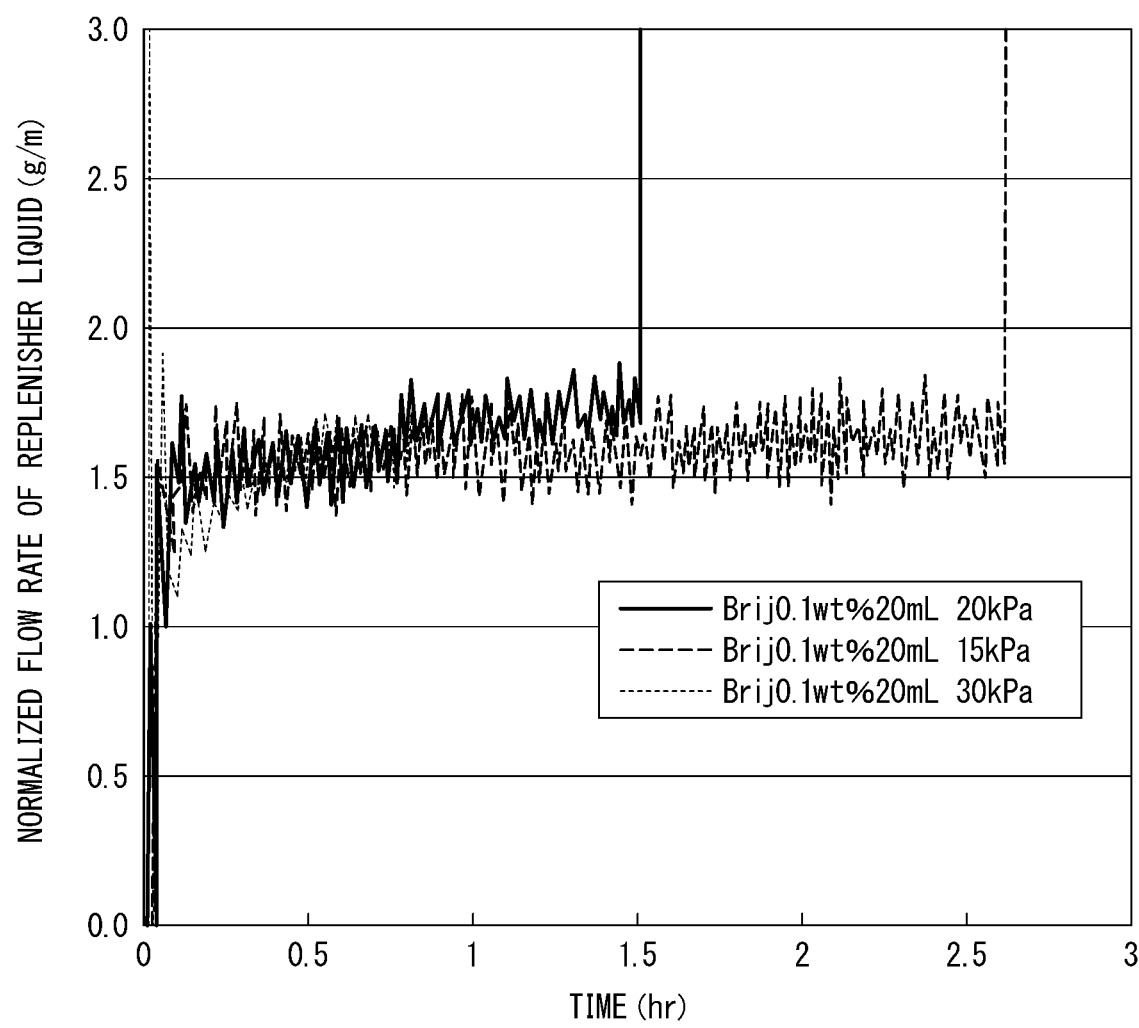
FIG. 11 is a diagram showing a relationship between a process time and a normalized flow rate of a replenisher liquid in the cross-flow filtration process in Experimental Example 2.

FIG. 11 shows a relationship between the normalized flow rate of the replenisher liquid calculated using the foregoing Expression (2) and the processing time.

It was confirmed from the results of FIG. 11 that the normalized flow rate of the replenisher liquid normalized using the transmembrane pressure (TMP) did not depend on a variation in pressure ($P_f$) of the solution B1 in the inner chamber 21 on the inlet side thereof in the filter module 20 and was a constant value, i.e., about 1.5 g/m.

Experimental Example 3

A solution A2 obtained by dissolving 0.01 wt % of polyoxyethylene (100) stearyl ether (trade name: Brij S100; manufactured by Sigma-Aldrich) which is a non-ionic surfactant in pure water was prepared. The cross-flow filtration process was performed as in Experimental Example 2.

Figure 12:
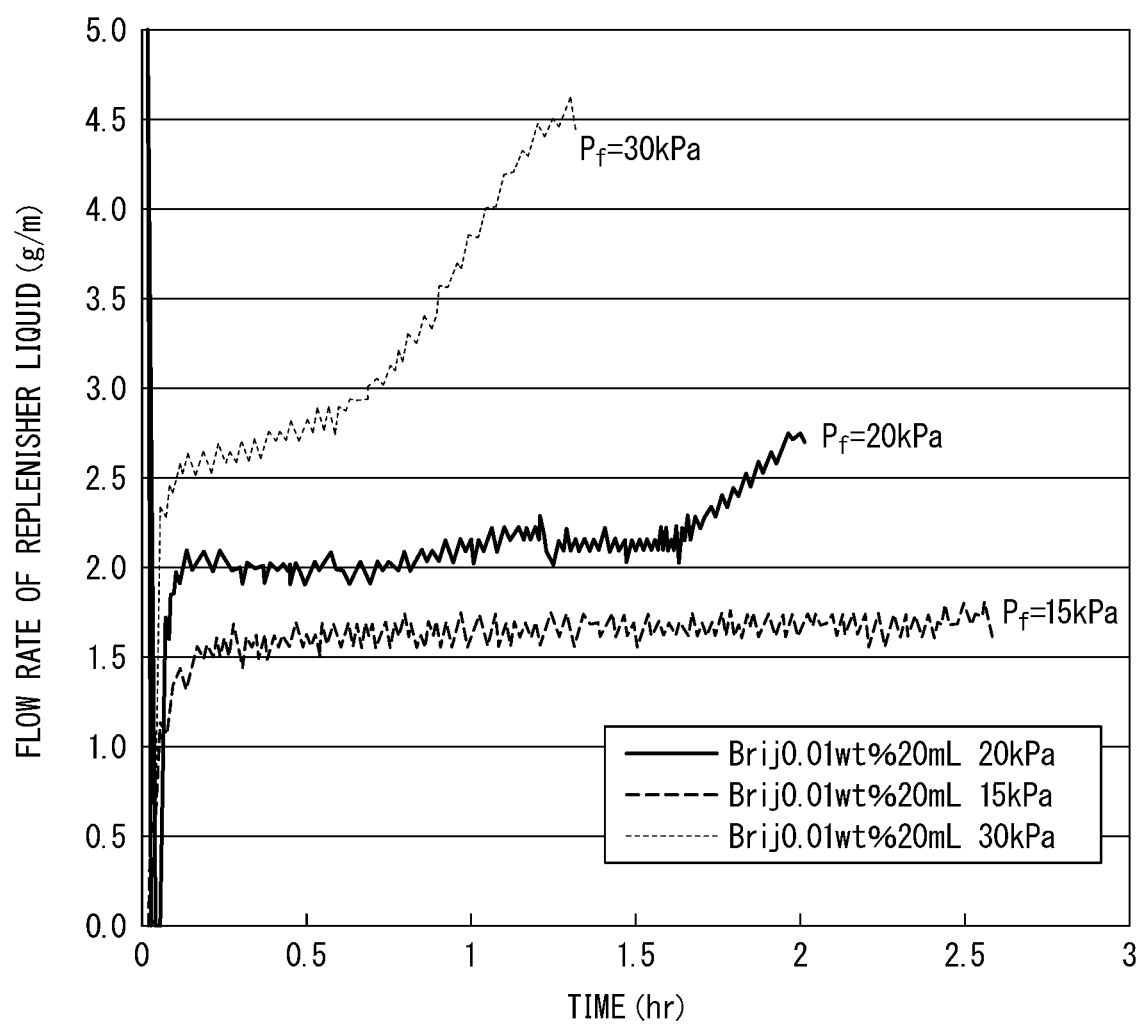
FIG. 12 is a diagram showing a relationship between a processing time and a flow rate of a replenisher liquid in a cross-flow filtration process in Experimental Example 3.

In the cross-flow filtration process, as a processing time had elapsed, an amount of replenisher liquid to be consumed was measured and an amount of replenisher liquid (a flow rate of the replenisher liquid) to be consumed per unit time was calculated. FIG. 12 shows a relationship between the processing time and the flow rate of the replenisher liquid.

From the results of FIG. 12, a flow rate of the replenisher liquid increases as a pressure ($P_f$) of a solution A2 in the inner chamber 21 on the inlet side thereof in the filter module 20 increases.

Figure 13:
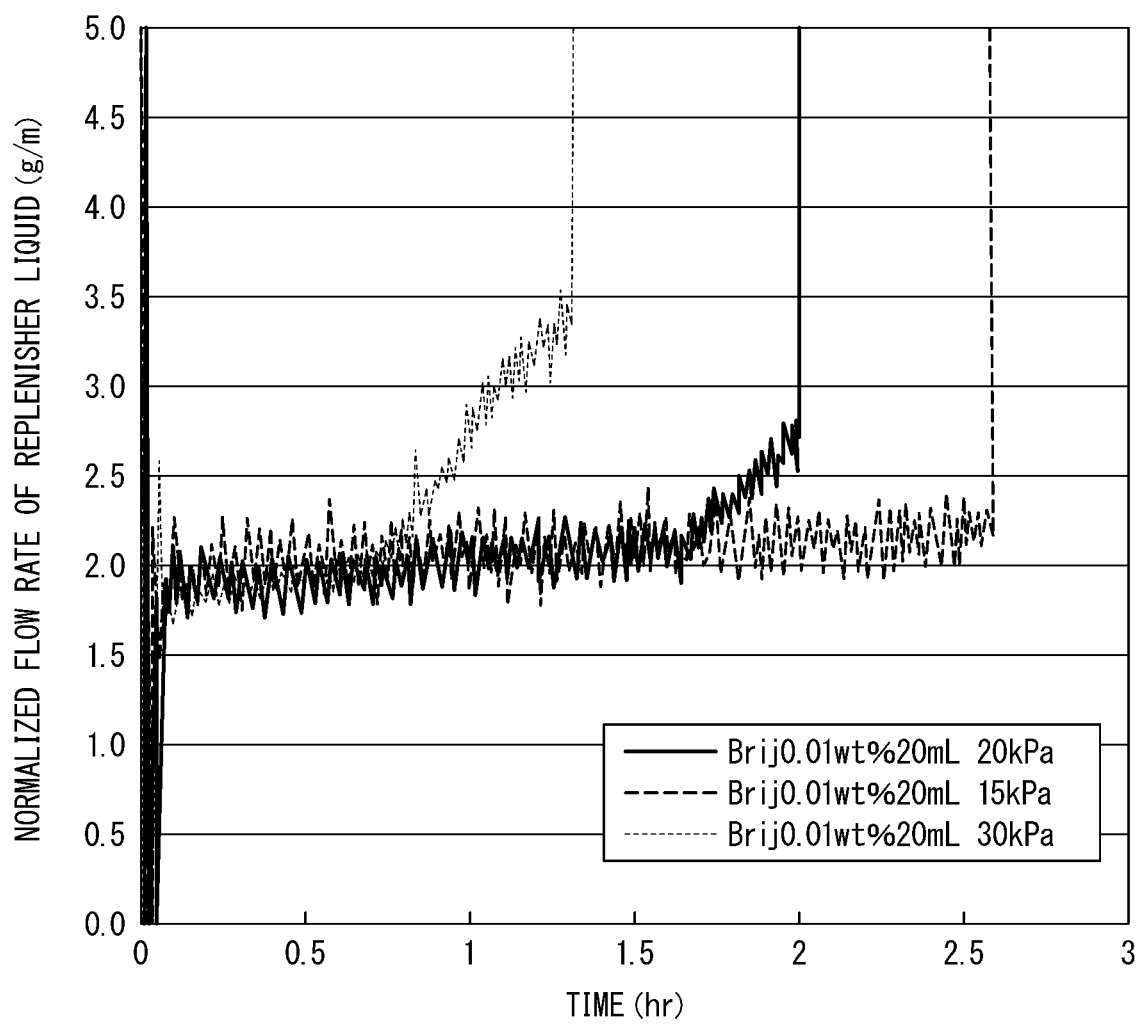
FIG. 13 is a diagram showing a relationship between a processing time and a normalized flow rate of a replenisher liquid in the cross-flow filtration process in Experimental Example 3.

Also, as in Experimental Example 2, FIG. 13 shows a relationship between the normalized flow rate of the replenisher liquid calculated using the foregoing Expression (2) and the processing time.

It was confirmed from the results of FIG. 13 that the normalized flow rate of the replenisher liquid normalized using the transmembrane pressure (TMP) did not depend on a variation in pressure ($P_f$) of the solution A1 in the inner chamber 21 on the inlet side thereof in the filter module 20 and was a constant value, i.e., about 2.1 g/m.

It was found from the results of Experimental Example 2 and Experimental Example 3 that, when the normalized flow rate of the replenisher liquid corrected using the transmembrane pressure (TMP) was used during the cross-flow filtration process, it was possible to know the concentration of the surfactant remaining and to remove the surfactant with high accuracy even if pressure fluctuations occurred during the cross-flow filtration process. Generally, the pressure regulator 50 in which pressure control is possible using a signal from the controller 70 is very expensive. However, when the normalized flow rate of the replenisher liquid normalized using the transmembrane pressure (TMP) is calculated as in the present invention, even if an inexpensive manual pinch valve is used as a pressure regulator, it is possible to remove the surfactant with high accuracy even when pressure fluctuations occur.

Also, although a case in which the flow rate of the replenisher liquid calculated from the foregoing Expression (2) using the transmembrane pressure (TMP) is corrected has been described above, the same effect is obtained even if the flow rate of a replenisher liquid is corrected using the pressure ($P_f$) in the inner chamber 21 on the inlet side thereof, a pressure average value of ($P_f$) on the inlet side and the pressure ($P_r$) on the outlet side in the inner chamber 21, or the like, instead of the transmembrane pressure (TMP).

Experimental Example 4

A case in which a surfactant contained in a dispersion liquid containing single-walled nanotubes (hereinafter referred to as a "single-walled carbon nanotube dispersion liquid") is removed will be described. As the single-walled carbon nanotube dispersion liquid, a single-walled carbon nanotube dispersion liquid which has been subjected to ultrasonic dispersion processing or purification using ultracentrifugation or a single-walled carbon nanotube dispersion liquid which has been separated into metallic single-walled carbon nanotubes and semiconducting single-walled carbon nanotubes using, for example, an electrophoresis method or the like are exemplary examples. The single-walled carbon nanotube dispersion liquid contains a surfactant of about several wt %.

When such a single-walled carbon nanotube dispersion liquid is used for electrical applications, electronic devices, or the like, the surfactant inhibits electrical conduction. For this reason, it is necessary to remove an excessive surfactant contained in the single-walled carbon nanotube dispersion liquid.

The case of Brij S100 which is one of the non-ionic surfactants will be described in detail. For example, since a critical micelle concentration (CMC) of Brij S100 is about 0.01 wt %, if a concentration of Brij S100 in the single-walled carbon nanotube dispersion liquid is less than 0.01 wt %, single-walled nanotubes aggregate without being stably dispersed. Therefore, a lower limit of a concentration of the non-ionic surfactant in the single-walled carbon nanotube dispersion liquid is 0.01 wt %. On the other hand, when single-walled nanotubes are applied to electronic devices, an upper limit of a concentration of the non-ionic surfactant in the single-walled carbon nanotube dispersion liquid in which electrical conduction is not prevented is 0.1 wt %. If the concentration of the single-walled carbon nanotube dispersion liquid is 0.1 wt % or less, after single-walled nanotubes are deposited on a substrate, it is possible to sufficiently remove Brij S100 through cleaning using a solution or thermal decomposition using heat treatment.

For these reasons, when the single-walled carbon nanotube dispersion liquid is used for electrical applications, electronic devices, or the like, it is necessary to make the concentration of the non-ionic surfactant in the single-walled carbon nanotube dispersion liquid about several times the critical micell concentration.

A dispersion liquid was prepared by dispersing a single-walled carbon nanotube mixture (enhanced direct injection pyrolytic synthesis (eDIPS) single-walled nanotube; average diameter: 1.0 nm) in pure water using Brij S100 which is a non-ionic surfactant and extracting semiconducting single-walled nanotubes with high purity using, for example, the method described in Patent Document 1. Although the concentration of the non-ionic surfactant contained in the semiconducting single-walled carbon nanotube dispersion liquid is unclear, in order to use for electronic device applications, the concentration of Brij S100 needs to be 0.1 wt % or less. Furthermore, in order to stably disperse semiconducting single-walled nanotubes for a long period of time, it is necessary to keep the concentration of Brij S100 higher than the critical micell concentration (CMC) of Brij S100 of 0.01 wt %.

Subsequently, a solution A3 obtained by dissolving 0.01 wt % of polyoxyethylene (100) stearyl ether (trade name: Brij S100; manufactured by Sigma-Aldrich) which is a non-ionic surfactant in pure water and a solution B3 obtained by dissolving 0.1 wt % of polyoxyethylene (100) stearyl ether (trade name: Brij S100; manufactured by Sigma-Aldrich) which is a non-ionic surfactant in pure water were prepared. The solution A3 and the solution B3 had an amount of 20 mL.

The solution A3 was subjected to the cross-flow filtration process using the cross-flow filtration device 10 shown in FIG. 1. The pressure was adjusted so that the TMP calculated by the foregoing Expression (1) was 24 kPa and a flow rate of the replenisher liquid was measured. The flow rate of the replenisher liquid when a cross flow started was about 2.1 g/m. This is a flow rate of the replenisher liquid when a concentration of the surfactant is at a lower limit.

The solution B3 was subjected to the cross-flow filtration process using the cross-flow filtration device 10 shown in FIG. 1. The pressure was adjusted so that the TMP calculated by the foregoing Expression (1) was 24 kPa and a flow rate of the replenisher liquid was measured. The flow rate of the replenisher liquid when a cross flow started was about 1.5 g/m. This is a flow rate of the replenisher liquid when a concentration of the surfactant is at an upper limit.

Subsequently, the above-described semiconducting single-walled carbon nanotube dispersion liquid in which the concentration of the surfactant was unclear was subjected to the cross-flow filtration process.

The above-described semiconducting single-walled carbon nanotube dispersion liquid was subjected to the cross-flow filtration process by setting a flow rate of the replenisher liquid of 1.7 g/m between flow rates of the replenisher liquids of the solution A3 and the solution B3 to a threshold value flow rate and an over processing time to 60 minutes.

Figure 14:
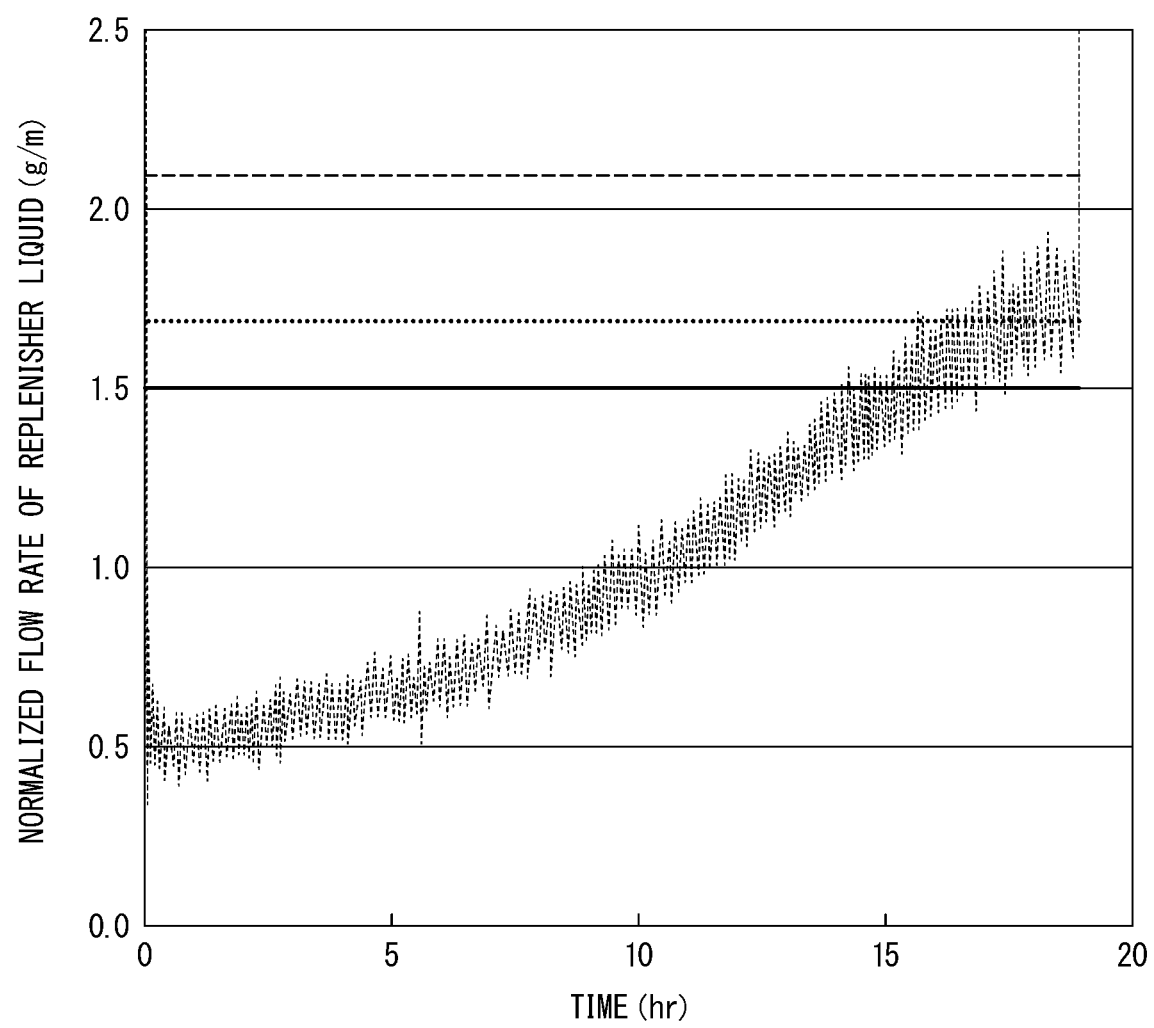
FIG. 14 is a diagram showing a relationship between a processing time and a normalized flow rate of a replenisher liquid in a cross-flow filtration process in Experimental Example 4.

In the process of removing the non-ionic surfactant, a (cumulative) flow volume of the replenisher liquid was measured with the progress of processing time and the flow rate of the replenisher liquid was calculated. Furthermore, the pressure during the processing was measured and the transmembrane pressure (TMP) was calculated using the foregoing Expression (1). In addition, a normalized flow rate of the replenisher liquid was calculated from the flow rate of the replenisher liquid and the transmembrane pressure (TMP) in a state in which a standard TMP is set to 24 kPa using the foregoing Expression (2). Times at which the normalized flow rate of the replenisher liquid exceeded a threshold value flow rate are integrated and the cross-flow filtration process stopped at a time at which the integrated time reached 60 minutes which is an over processing time. A relationship between the processing time and the normalized flow rate of the replenisher liquid was calculated. FIG. 14 shows the results.

The normalized flow rate of the replenisher liquid fluctuates finely due to pressure fluctuations due to the pulsation of the pump 40 for a short period of time. For this reason, in order for the integrated time exceeding the threshold value flow rate to reach 60 minutes set as the over processing time, a processing time longer than 60 minutes is required. A normalized flow rate of the replenisher liquid when the process ends is sufficiently larger than about 1.5 g/m when a target upper limit is 0.1 wt % and is sufficiently smaller than about 2.1 g/m when a lower limit is 0.01 wt %.

Also, the absorbance of the single-walled carbon nanotube dispersion liquid which has been subjected to the process was measured using a spectrophotometer (trade name: an ultraviolet (UV)-visible near-earth spectrophotometer UV-3600; manufactured by Shimadzu Corporation).

Figure 15:
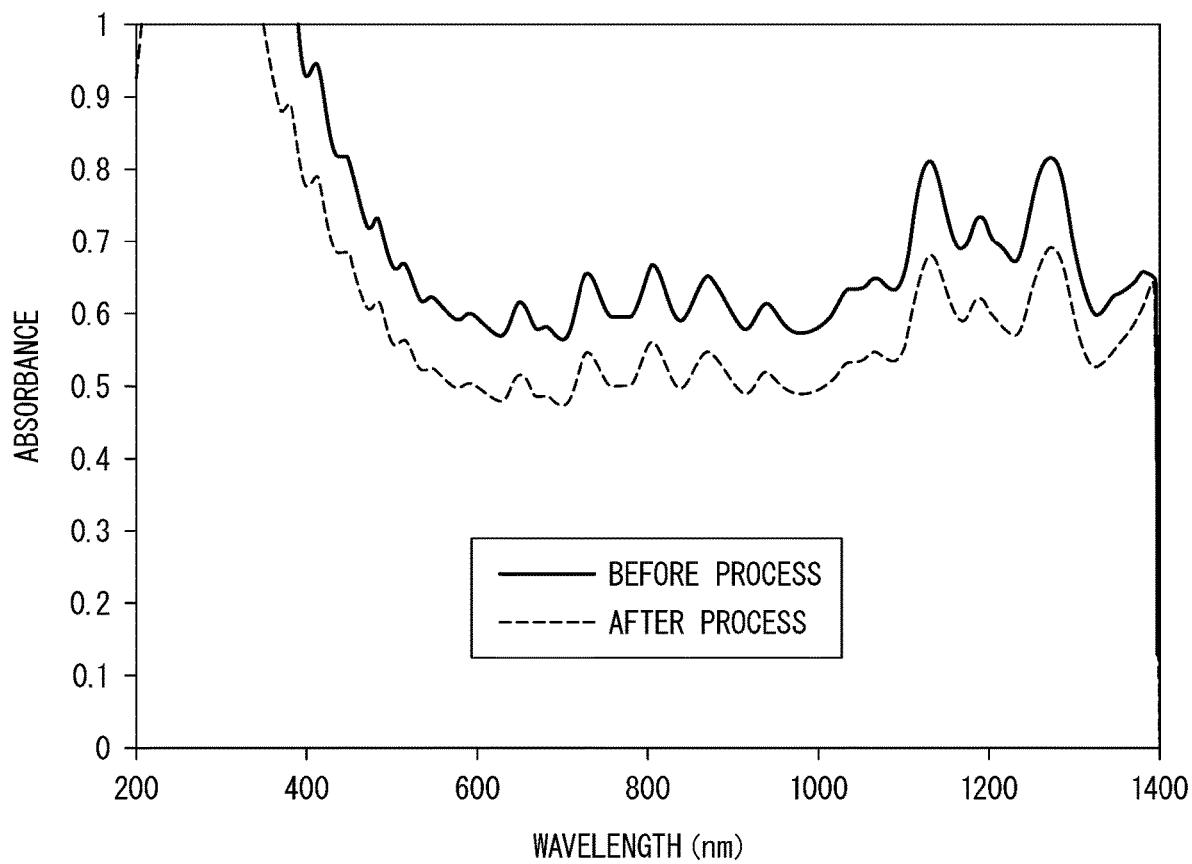
FIG. 15 is a diagram showing absorption spectra of a single-walled carbon nanotube dispersion liquid before and after a cross-flow filtration process in Experimental Example 4.

FIG. 15 shows the results. Generally, it is known that, when single-walled nanotubes aggregate, a steep peak observed in the absorbance becomes dull.

It was confirmed from the results of FIG. 15 that, in the single-walled carbon nanotube dispersion liquid, before and after the cross-flow filtration process, there was no evidence of aggregation of single-walled nanotubes and it was confirmed that the monodispersity of single-walled nanotubes was maintained.

Also, a concentration of Brij S100 which is a surfactant in the single-walled carbon nanotube dispersion liquid which has been subjected to the process was examined. The concentration of Brij S100 in the single-walled carbon nanotube dispersion liquid is obtained by analyzing a refractive index and the absorbance in detail. The result was 0.029 wt %. A semiconducting single-walled carbon nanotube dispersion liquid having a target concentration of the surfactant was obtained.

Figure 16:
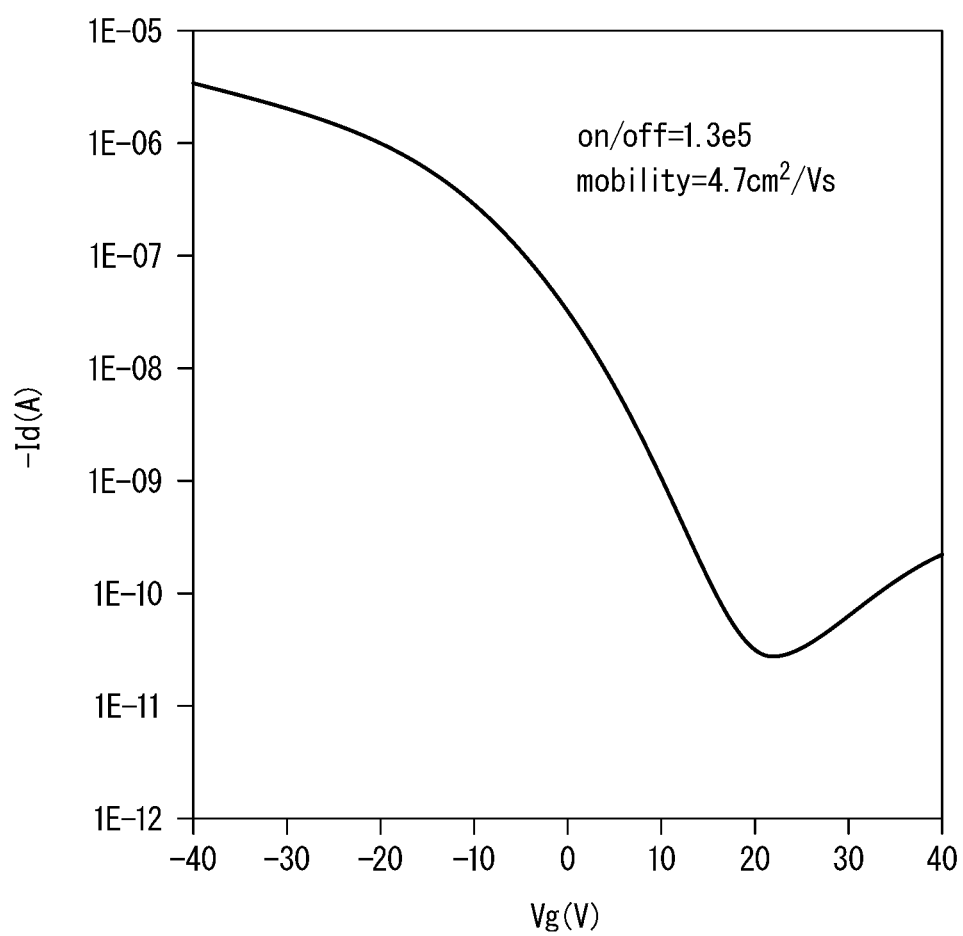
FIG. 16 is a diagram showing transfer characteristics of a thin film transistor prepared in Experimental Example 4.

A thin film transistor was prepared using the semiconducting single-walled carbon nanotube dispersion liquid obtained described above as a CNT ink First, a gate electrode, a gate insulating film, and source/drain electrodes were formed above a plastic substrate. The CNT ink was dropped between the source/drain electrodes and dried. Brij S100 remaining above the substrate was removed using cleaning using a solution and heat treatment. FIG. 16 shows transfer characteristics of the prepared thin film transistor. Good characteristics, i.e., an on/off current ratio of $10^5$ or more and a field effect mobility of 4.7 $cm^2$/Vs were obtained. In the cross-flow filtration device and the cross-flow filtration method of the present invention, a concentration of an excessive surfactant in the semiconducting single-walled carbon nanotube dispersion liquid was reduced. As a result, the surfactant could prevent electrical conduction from being inhibited and a good special thin film transistor be obtained.

Experimental Example 5

Seven types of dispersion liquids were prepared by dispersing a single-walled carbon nanotube mixture (enhanced direct injection pyrolytic synthesis: improved direction injection thermal decomposition synthesis (eDIPS) single-walled nanotube; average diameter: 1.0 nm) in pure water using Brij S100 which is a non-ionic surfactant and extracting semiconducting single-walled nanotubes with high purity using, for example, the method described in Patent Document 1. Concentrations of non-ionic surfactants contained in these semiconducting single-walled carbon nanotube dispersion liquids are unclear.

Each solution was subjected to the cross-flow filtration process using the cross-flow filtration device 10 shown in FIG. 1, as in Experimental Example 4.

In Table 1, an amount of each solution at the time of start, a time required for processing, and a concentration of Brij S100 which had been subjected to processing were summarized together. The time required for processing depends on an amount of a solution at the time of start or an (unclear) concentration of Brij S100 at the time of start. However, if the cross-flow filtration device and the cross-flow filtration method of the present invention were used, it was possible to obtain a dispersion liquid having good reproducibility and a desired concentration of surfactant regardless of an initial state of a processing solution.

Also, when the semiconducting single-walled carbon nanotube dispersion liquid which had been subjected to these processes was used as the CNT ink, it was possible to obtain a thin film transistor having excellent characteristics, as in Experimental Example 4.

Furthermore, in the cross-flow filtration device of the present invention, if a valve and the like is added in the middle of the third pipe 143 which connects the injection pipe 33 in the process liquid tank 30 to the suction pipe 61 in the replenisher tank 60, it is possible to temporarily maintain a pressure inside the process liquid tank 30 at atmospheric pressure. If the pressure inside the process liquid tank 30 is maintained at atmospheric pressure, even if the process liquid 200 in the process liquid tank 30 is reduced, the replenisher liquid 210 is not replenished. As a result, it is possible to concentrate the single-walled nanotubes and the surfactant in the process liquid 200. When the concentration of the single-walled nanotubes in the process liquid 200 is lower than that of the applications, it is possible to perform concentration using the above-described means. After concentration has been performed to a desired concentration of single-walled nanotubes, if the valve added to the third pipe 143 is closed and the processing is continuously performed, it is possible to remove the excessively concentrated surfactant.

TABLE 1

| # | AMOUNT OF SOLUTION AT TIME OF START (mL) | PROCESSING TIME (hr) | CONCENTRATION AT TIME OF END (wt %) |
|---|---|---|---|
| 1 | 5.0 | 24.7 | 0.053 |
| 2 | 6.0 | 18.2 | 0.052 |
| 3 | 5.0 | 8.2 | 0.023 |
| 4 | 5.0 | 6.3 | 0.074 |
| 5 | 8.0 | 34.3 | 0.038 |
| 6 | 7.5 | 46.5 | 0.036 |
| 7 | 5.5 | 23.2 | 0.045 |

INDUSTRIAL APPLICABILITY

A cross-flow filtration device and a cross-flow filtration method of the present invention can efficiently determine the end of a process of removing excess components contained in a process liquid in the process of removing excess components.

A part of all of the above example embodiments can be described as the following supplementary notes, but is not limited to the following description.

(Supplementary Note 1) A cross-flow filtration device includes: a filter module which includes an inner chamber and an outer chamber separated by a semipermeable membrane; a process liquid tank which is configured to accommodate a process liquid; a pump which is configured to cause the process liquid to circulate to the inner chamber in the filter module and the process liquid tank; a replenisher tank which is configured to accommodate a replenisher liquid to be replenished into the process liquid tank; at least one or more sensors which are configured to measure a pressure of the circulating process liquid; and a replenisher measurement unit which is configured to measure an amount of the replenisher liquid supplied from the replenisher tank to the process liquid tank, wherein the process liquid tank is configured to be continuously replenished with the replenisher liquid.

(Supplementary Note 2) The cross-flow filtration device according to Supplementary Note 1, including: a controller which is configured to control an amount of the process liquid circulating from the process liquid tank to the inner chamber using the pump based on an amount of the replenisher liquid.

(Supplementary Note 3) The cross-flow filtration device according to Supplementary Note 1 or Supplementary Note 2, wherein the replenisher measurement unit is configured to measure a flow rate of the replenisher liquid supplied from the replenisher tank to the process liquid tank.

(Supplementary Note 4) The cross-flow filtration device according to Supplementary Note 3, including: a controller which is configured to control an amount of the process liquid circulating from the process liquid tank to the inner chamber using the pump on the basis of the flow rate of the replenisher liquid.

(Supplementary Note 5) The cross-flow filtration device according to Supplementary Note 1 or Supplementary Note 2, including: a permeation liquid measurement unit in an outlet in the outer layer, wherein a flow rate of a permeation liquid is measured.

(Supplementary Note 6) The cross-flow filtration device according to Supplementary Note 5, including: a controller which is configured to control an amount of the process liquid circulating from the process liquid tank to the inner chamber using the pump based on the flow rate of the permeation liquid.

(Supplementary Note 7) A cross-flow filtration method using the cross-flow filtration device according to any one of Supplementary Notes 1 to 6, including: a step of causing the process liquid to circulate to the inner chamber and the process liquid tank, and a step of determining the end of circulation of the process liquid in accordance with the amount of replenisher liquid in the replenisher tank.

(Supplementary Note 8) The cross-flow filtration method according to Supplementary Note 7, including: a step of adjusting the amount of the process liquid circulating to the inner chamber based on a pressure of the process liquid in the inner chamber on an inlet side of the inner chamber, a pressure of the process liquid in the inner chamber on the outlet side of the inner chamber, and a pressure of the permeation liquid which has passed through the semipermeable membrane at a drain port of the outer chamber.

(Supplementary Note 9) The cross-flow filtration method according to Supplementary Note 7 or Supplementary Note 8, wherein, in the step of determining the end of circulation of the process liquid, the end of circulation of the process liquid is determined based on measurement results of the flow rate of the replenisher liquid supplied from the replenisher tank to the process liquid tank.

(Supplementary Note 10) The cross-flow filtration method according to Supplementary Note 9, wherein, in the step of determining the end of circulation of the process liquid, the flow rate of the replenisher liquid is corrected based on measurement results of the pressure of the circulating process liquid and the end of circulation of the process liquid is determined based on the measurement results of the flow rate of the replenisher liquid obtained through the correction.

(Supplementary Note 11) The cross-flow filtration method according to Supplementary Note 8, wherein the end of circulation of the process liquid is determined based on measurement results of the flow rate of the permeation liquid.

(Supplementary Note 12) The cross-flow filtration method according to Supplementary Note 11, wherein the flow rate of the permeation liquid is corrected based on measurement results of the pressure of the circulating process liquid and the end of circulation of the process liquid is determined based on measurement results of the flow rate of the permeation liquid obtained through the correction.

(Supplementary Note 13) The cross-flow filtration method according to any one of Supplementary Notes 7 to 12, wherein the process liquid is a nanocarbon dispersion liquid in which nanocarbons and a non-ionic surfactant are dispersed in a solvent.

(Supplementary Note 14) The cross-flow filtration method according to Supplementary Note 13, wherein the nanocarbons are single-walled nanotubes.

REFERENCE SYMBOLS 10, 300 Cross-flow filtration device
20 Filter module
21 Inner chamber
22 Outer chamber
23 Semipermeable membrane
24 Drain port
30 Process liquid tank
31 Suction pipe
32 Recovery pipe
33 Injection pipe
40 Pump
50 Pressure regulator
60 Replenisher tank
61 Suction pipe
62 Ventilation pipe
70 Controller
80 Replenisher measurement unit
90 First pressure sensor
100 Second pressure sensor
110 Third pressure sensor
120 Permeation liquid tank
121 Recovery pipe
122 Ventilation pipe
130 Permeation liquid measurement unit
141 First pipe
142 Second pipe
143 Third pipe
144 Fourth pipe 151, 152, 153, 154, 155, 156, 157 Cable
200 Process liquid
210 Replenisher liquid
220 Permeation liquid
310 First flow meter
320 Second flow meter

The invention claimed is:

1. A cross-flow filtration method comprising:
causing a process liquid to circulate to an inner chamber and a process liquid tank, and
determining an end of circulation of the process liquid in accordance with an amount of replenisher liquid supplied from a replenisher tank to the process liquid tank,
wherein the process liquid tank is airtight, and
wherein the process liquid is a nanocarbon dispersion liquid containing nanocarbons and a surfactant.

2. The cross-flow filtration method according to claim 1, comprising:
adjusting an amount of the process liquid circulating to the inner chamber based on a pressure of the process liquid in the inner chamber on an inlet side of the inner chamber, a pressure of the process liquid in the inner chamber on an outlet side of the inner chamber, and a pressure of a permeate which has passed through a semipermeable membrane at a drain port of an outer chamber.

3. The cross-flow filtration method according to claim 1, wherein, in the determining the end of circulation of the process liquid, the end of circulation of the process liquid is determined based on measurement results of a flow rate of the replenisher liquid supplied from the replenisher tank to the process liquid tank.

4. The cross-flow filtration method according to claim 3, wherein, in the determining the end of circulation of the process liquid, the flow rate of the replenisher liquid is corrected based on measurement results of a pressure of the circulating process liquid and the end of circulation of the process liquid is determined based on the corrected flow rate.

5. The cross-flow filtration method according to claim 1, wherein the end of circulation of the process liquid is determined based on measurement results of a flow rate of a permeate.

6. The cross-flow filtration method according to claim 5, wherein the flow rate of the permeate is corrected based on measurement results of a pressure of the circulating process liquid and the end of circulation of the process liquid is determined based on the corrected flow rate.

7. The cross-flow filtration method according to claim 1, wherein the nanocarbon dispersion liquid is a nanocarbon dispersion liquid in which the nanocarbons and the surfactant are dispersed in a solvent, the surfactant including a non-ionic surfactant.

8. The cross-flow filtration method according to claim 1, wherein the nanocarbons are single-walled nanotubes.

9. The cross-flow filtration method according to claim 2, wherein, in the determining the end of circulation of the process liquid, the end of circulation of the process liquid is determined based on measurement results of a flow rate of the replenisher liquid supplied from the replenisher tank to the process liquid tank.

10. The cross-flow filtration method according to claim 9, wherein, in the determining the end of circulation of the process liquid, the flow rate of the replenisher liquid is corrected based on measurement results of a pressure of the circulating process liquid and the end of circulation of the process liquid is determined based on the corrected flow rate.

11. The cross-flow filtration method according to claim 2, wherein the end of circulation of the process liquid is determined based on measurement results of a flow rate of a permeate.

12. The cross-flow filtration method according to claim 11, wherein the flow rate of the permeate is corrected based on measurement results of a pressure of the circulating process liquid and the end of circulation of the process liquid is determined based on the corrected flow rate.

13. The cross-flow filtration method according to claim 2, wherein the nanocarbon dispersion liquid is a nanocarbon dispersion liquid in which the nanocarbons and the surfactant are dispersed in a solvent, the surfactant including a non-ionic surfactant.

14. The cross-flow filtration method according to claim 2, wherein the nanocarbons are single-walled nanotubes.

* * * * *